US008053720B2

(12) United States Patent
Han et al.

(10) Patent No.: US 8,053,720 B2
(45) Date of Patent: Nov. 8, 2011

(54) MULTI-FREQUENCY MILLIMETER-WAVE VLBI RECEIVING SYSTEM AND METHOD OF DESIGNING QUASI OPTICAL CIRCUIT FOR THE SAME

(75) Inventors: Seog Tae Han, Daejeon (KR); Jung Won Lee, Seoul (KR); Do Heung Je, Koyang (KR); Moon Hee Chung, Namyangju (KR)

(73) Assignee: Korea Astronomy and Space Science Institute (KR)

( * ) Notice: Subject to any disclaimer, the term of this patent is extended or adjusted under 35 U.S.C. 154(b) by 276 days.

(21) Appl. No.: 12/432,151

(22) Filed: Apr. 29, 2009

(65) Prior Publication Data

US 2010/0127161 A1 May 27, 2010

(30) Foreign Application Priority Data

Nov. 26, 2008 (KR) ........................ 10-2008-0118346

(51) Int. Cl.
*G01J 1/00* (2006.01)

(52) U.S. Cl. ................... 250/226; 250/339.14; 250/342; 343/721

(58) Field of Classification Search .................. 250/226, 250/338.1, 339.01, 339.14, 342; 342/26 R, 342/26 D, 458, 465; 343/721
See application file for complete search history.

(56) References Cited

U.S. PATENT DOCUMENTS

| | | | | |
|---|---|---|---|---|
| 4,356,494 | A * | 10/1982 | Katagi et al. | 343/781 CA |
| 4,439,012 | A * | 3/1984 | Christy | 359/859 |
| 6,028,300 | A * | 2/2000 | Rhoads et al. | 250/208.1 |
| 7,379,515 | B2 * | 5/2008 | Johnson et al. | 375/347 |
| 7,656,352 | B2 * | 2/2010 | Alban et al. | 342/458 |
| 2006/0121893 | A1 * | 6/2006 | Tillotson et al. | 455/431 |
| 2010/0127161 | A1 * | 5/2010 | Han et al. | 250/226 |
| 2010/0290025 | A1 * | 11/2010 | Parker | 356/3 |

* cited by examiner

*Primary Examiner* — John Lee
(74) *Attorney, Agent, or Firm* — Ostrolenk Faber LLP

(57) ABSTRACT

Provided are a multi-frequency millimeter-wave very long baseline interferometry (VLBI) receiving system and a method of designing a quasi optical circuit for the multi-frequency millimeter-wave VLBI receiving system. The multi-frequency millimeter-wave VLBI receiving system includes a plurality of low pass filters, offset ellipsoidal mirrors, and flat mirrors for dividing a cosmic radio wave signal incident through the troposphere. A beam propagated from a celestial point is introduced into a receiver room via a 45-degree flat mirror and is divided into a plurality of beams by using a plurality of low pass filters having different bandwidths and mirrors, and the divided beams are transmitted to corresponding quasi-optical receivers having different bandwidths via a plurality of mirrors. Therefore, radio astronomic observations can be simultaneously performed in 22 GHz, 43 GHz, 86 GHz, and 129 GHz bands, and phase variations of electromagnetic waves in the bands can be compensated for.

22 Claims, 15 Drawing Sheets

Table 2 Beam parameters of the receiver optics;all units in millimeters unless otherwise noted.

| Freq. (GHz) | $\omega_{01}$ | A | w(M1)<br>$f$<br>$R_i$<br>$R_o$ | B | $\omega_{02}$ | C | w(M2)<br>$f$<br>$R_i$<br>$R_o$ | D | $\omega_{03}$ | E | w(M3)<br>$f$<br>$R_i$<br>$R_o$ | F | $\omega_{04}$ |
|---|---|---|---|---|---|---|---|---|---|---|---|---|---|
| 21 | 50.93 | 600 | 76.44<br>600<br>1148.77<br>-1256.02 | 642.78 | 53.41 | 957.22 | 97.39<br>957.22<br>1369.01<br>-3182.29 | 957.22 | 81.44 | 462.78 | 85.43<br>462.78<br>5065.14<br>-509.31 | 462.78 | 25.82 |
| 42 | 25.51 | 600 | 60.00<br>600<br>744.25<br>-3095.74 | 642.78 | 53.41 | 850 | 64.50<br>850<br>2704.95<br>-1239.95 | 850.00 | 36.157 | 250 | 39.42<br>250<br>-1574.30<br>-297.20 | 250 | 15.71 |
| 84 | 12.76 | 400 | 38.04<br>400<br>453.47<br>-3392.16 | 419.01 | 35.61 | 880.99 | 45.36<br>880.99<br>2295.07<br>-1429.86 | 880.99 | 28.11 | 200.01 | 29.25<br>200.01<br>2617.59<br>-216.56 | 200.01 | 8.08 |
| 127 | 8.44 | 400 | 36.69<br>400<br>423.48<br>-7215.16 | 419.01 | 35.61 | 900 | 40.36<br>900<br>4064.13<br>-1115.99 | 900 | 18.99 | 150 | 19.90<br>150<br>1685.96<br>164.65 | 150 | 5.93 |

MULTI-FREQUENCY MILLIMETER-WAVE VLBI RECEIVING SYSTEM AND METHOD OF DESIGNING QUASI OPTICAL CIRCUIT FOR THE SAME

CROSS-REFERENCE TO RELATED PATENT APPLICATION

This application claims the benefit of Korean Patent Application No. 10-2008-0118346, filed on Nov. 26, 2008, in the Korean Intellectual Property Office, the disclosure of which is incorporated herein in its entirety by reference.

BACKGROUND OF THE INVENTION

1. Field of the Invention

The present invention relates to a multi-frequency millimeter-wave Very Long Baseline Interferometry (VLBI) receiving system and a method of designing a quasi optical circuit for the multi-frequency millimeter-wave VLBI receiving system, and more particularly, to a multi-frequency millimeter-wave VLBI receiving system for performing radio astronomic observations simultaneously in 22 GHz, 43 GHz, 86 GHz, and 129 GHz bands, and a method of designing a quasi optical circuit for the multi-frequency millimeter-wave VLBI receiving system.

2. Description of the Related Art

During past several years, many observations were conducted using millimeter-wave VLBI. However, phase fluctuations caused by the troposphere impose a limit on the imaging ability of the millimeter-wave VLBI and reduce the sensitivity of the millimeter-wave VLBI.

To implement compensation for the tropospheric phase fluctuation with the lowest frequency band, a special multi-frequency quasi-optical system pointing the same position in sky needs to be devised.

SUMMARY OF THE INVENTION

The present invention provides a multi-frequency millimeter-wave VLBI receiving system for receiving a cosmic radio wave signal beam (hereinafter, referred to as a beam) propagated from a celestial point at the same time in 22 GHz, 43 GHz, 86 GHz, and 129 GHz bands for observing and compensating for phase variations of the beam, and a method of designing a quasi-optical circuit for the multi-frequency millimeter-wave VLBI receiving system.

The present invention also provides a multi-frequency millimeter-wave VLBI receiving system for dividing a beam propagated from a celestial point and introduced into a receiver room via a 45-degree flat mirror into a plurality of beams by using a plurality of low pass filters having different bandwidths, transmitting the divided beams to optical receivers having corresponding frequency bands via a plurality of ellipsoidal mirrors and flat mirrors, and observing and compensating for phase variations of the beams simultaneously, and a method of designing a quasi optical circuit for the multi-frequency millimeter-wave VLBI receiving system.

The present invention also provides a multi-frequency millimeter-wave VLBI receiving system including a plurality of low pass filters, offset ellipsoidal mirrors, and flat mirrors for dividing a beam incident through the troposphere into a plurality of beams according to the frequency of the beam, and a method of designing a quasi optical circuit for the multi-frequency millimeter-wave VLBI receiving system.

The present invention also provides a multi-frequency millimeter-wave VLBI receiving system configured to operate with less power consumption by reflecting or transmitting (double reflecting) an incident beam according to the frequency of the beam by using a plurality of low pass filters having different frequency bands, and a method of designing a quasi optical circuit for the multi-frequency millimeter-wave VLBI receiving system.

According to an aspect of the present invention, a multi-frequency millimeter-wave VLBI receiving system is characterized in that: a cosmic radio wave signal beam propagated from a celestial point is introduced into a receiver room via a mirror and is frequency-divided into a plurality of beams by transmitting and reflecting the beam using a plurality of low pass filters having different bandwidths and a plurality of mirrors; the divided beams are transmitted to receivers having corresponding frequency bands via a plurality of mirrors; and phase variations of the beams are simultaneously observed and compensated for.

The multi-frequency millimeter-wave VLBI receiving system includes: a 45-degree flat mirror to introduce a beam propagated from a celestial point into the receiver room; a first low pass filter configured to reflect and transmit the beam incident from the 45-degree flat mirror; a first mirror configured to reflect the beam transmitted through the first low pass filter; a second low pass filter configured to reflect and transmit the beam reflected by the first mirror; second, eleventh, and third mirrors configured to reflect the beam transmitted through the second low pass filter sequentially; a first receiver configured to receive the beam reflected by the third mirror; fourth, twelfth, and fifth mirrors configured to reflect the beam reflected by the second low pass filter sequentially; a second receiver configured to receive the beam reflected by the fifth mirror; a sixth mirror configured to reflect the beam reflected by the first low pass filter; a third low pass filter configured to reflect and transmit the beam reflected by the sixth mirror; seventh, fifteenth, sixteenth, and eighth mirrors configured to reflect the beam transmitted through the third low pass filter sequentially; a third receiver configured to receive the beam reflected by the eighth mirror; ninth, thirteenth, fourteenth, and tenth mirrors configured to reflect the beam reflected by the third low pass filter sequentially; and a fourth receiver configured to receive the beam reflected by the tenth mirror.

The multi-frequency millimeter-wave VLBI receiving system may further include a 2 GHz and 8 GHz flip-flop flat mirror disposed above the 45-degree flat mirror.

The first low pass filter may have a cut-off frequency of about 70 GHz, the second low pass filter may have a cut-off frequency of 30 GHz, and the third low pass filter may have a cut-off frequency of 108 GHz.

The first to third low pass filters may be fabricated through either an etching process or using multi-layer structure metal meshes separated by air gaps.

The first to third low pass filters may receive the beams at an incident angle less than 20°.

The first to tenth mirrors may be ellipsoidal mirrors, and the eleventh to sixth mirrors may be flat mirrors.

The first or sixth mirror may satisfy the following equations:

$$l_1 = f - R_1$$

$$l_2 = -\frac{l_1}{R_1} \cdot f$$

-continued $$R_2 = \frac{l_2}{1 + \frac{l_1}{l_2} \cdot \frac{f}{R_1}} = \frac{l_2}{1 + \frac{l_1 - f}{R_1}} \to \infty$$

where $R_1$ denotes a radius of curvature of a beam incident onto an image subreflector, $R_2$ denotes a radius of curvature of a beam reflected by the ellipsoidal mirror, $I_1$ denotes a distance between the image subreflector and the ellipsoidal mirror, $I_2$ denotes a distance between the ellipsoidal mirror and $R_2$, and f denotes a distance from a focus of the image subreflector to the ellipsoidal mirror.

Phase mismatch on a surface of the first or sixth mirror may satisfy the following equation:

$$\Delta\phi_{total} = -\frac{\pi r^2}{\lambda} \cdot z\left(\frac{1}{R_1'^2} - \frac{1}{R_1^2} + \frac{1}{R_2'^2} - \frac{1}{R_2^2} + \frac{1}{f}\left(\frac{1}{R_2} - \frac{1}{R_2'}\right)\right)$$

where $R_1$ denotes a radius of curvature of a beam incident onto an image subreflector, $R_2$ denotes a radius of curvature of a beam reflected by the ellipsoidal mirror, and $R_1'$ and $R_2'$ denotes radii of curvature of beams at 22 GHz or 43 GHz for the first mirror and 86 GHz or 129 GHz for the sixth mirror.

Fractional loss caused by the phase mismatch may be expressed by the following equation:

$$1 - G = \left[\frac{\pi}{\lambda}\omega_m^3 \tan\theta_i \cdot \left(\frac{1}{R_1'^2} - \frac{1}{R_1^2} + \frac{1}{R_2'^2} - \frac{1}{R_2^2} + \frac{1}{f}\left(\frac{1}{R_2} - \frac{1}{R_2'}\right)\right)\right]^2$$

The first receiver may receive a 22 GHz band, the second receiver may receive a 43 GHz band, the third receiver may receive an 86 GHz band, and the fourth receiver may receive a 129 GHz band.

A distance between the 45-degree flat mirror and the first low pass filter may be 1010 mm±10 mm; a distance between the first low pass filter and the first mirror may be 600 mm±10 mm; a distance between the first mirror and the second low pass filter may be 642.78 mm±10 mm; a distance between the second low pass filter and the second mirror may be 957.22 mm±10 mm; a distance between the second mirror and the eleventh mirror may be 462.78 mm±10 mm; a distance between the eleventh mirror and the third mirror may be 320 mm±10 mm; and a distance between the third mirror and a corrugated horn of the first receiver may be 462.78 mm±10 mm.

An angle between incident and reflected beams at the second mirror may be 30°±5°, and an angle between incident and reflected beams at the third mirror may be 48°±5°.

A distance between the second low pass filter and the fourth mirror may be 850 mm±10 mm; a distance between the fourth mirror and the twelfth mirror may be 496 mm±10 mm; a distance between the twelfth mirror and the fifth mirror may be 604 mm±10 mm; and a distance between the fifth mirror and a corrugated horn of the second receiver may be 250 mm±10 mm.

An angle between incident and reflected beams at the second receiver may be 30°±5°; an angle between incident and reflected beams at the fourth mirror may be 31°±5°; an angle between incident and reflected beams at the twelfth mirror may be 37°±5°; and an angle between incident and reflected beams at the fifth mirror may be 50°±5°.

A distance between the first low pass filter and the sixth mirror may be 400 mm±10 mm; a distance between the sixth mirror and the third low pass filter may be 419 mm±10 mm; a distance between the third low pass filter and the seventh mirror may be 880.99 mm±10 mm; a distance between the seventh mirror and the fifteenth mirror may be 650 mm±10 mm; a distance between the fifteenth mirror and the sixteenth mirror may be 230.99 mm±10 mm; a distance between the sixteenth mirror and the eighth mirror may be 200.01 mm±10 mm; and a distance between the eighth mirror and a corrugated horn of the third receiver may be 200.01 mm±10 mm.

An angle between incident and reflected beams at the sixth mirror may be 50°±5°; an angle between incident and reflected beams at the seventh mirror may be 30°±5°; an angle between incident and reflected beams at the fifteenth mirror may be 53°±5°; and an angle between incident and reflected beams at the eighth mirror may be 520±5°.

A distance between the third low pass filter and the ninth mirror may be 900 mm±10 mm; a distance between the ninth mirror and the thirteenth mirror may be 660 mm+10 mm; a distance between the thirteenth mirror and the fourteenth mirror may be 262.5 mm±10 mm; a distance between the fourteenth mirror and the tenth mirror may be 127.5 mm±10 mm; and a distance between the tenth mirror and a corrugated horn of the fourth receiver may be 150 mm±10 mm.

An angle between incident and reflected beams at the sixth mirror may be 50°±5°; an angle between incident and reflected beams at the third low pass filter may be 30°±5°; an angle between incident and reflected beams at the ninth mirror may be 30°±5°; an angle between incident and reflected beams at the thirteenth mirror may be 57°±5°; and an angle between incident and reflected beams at the tenth mirror may be 52°±5°.

According to another aspect of the present invention, there is provided a method of designing a quasi optical circuit for a multi-frequency millimeter-wave VLBI receiving system, the method including: allowing a cosmic radio wave signal beam propagated from a celestial point to be incident into a receiver room via a flat mirror; dividing the beam into a plurality of beams by transmitting and reflecting the beam using a plurality of low pass filters having different bandwidths and a plurality of ellipsoidal mirrors; transmitting the divided beams to receivers having corresponding frequency bands via a plurality of flat mirrors; and simultaneously observing and compensating for phase variations of the beams transmitted to the receivers.

The beam may be divided into 22 GHz, 43 GHz, 86 GHz, and 129 GHz band beams, and phase variations of the 22 GHz, 43 GHz, 86 GHz, and 129 GHz band beams may be simultaneously observed and compensated for.

The beam may be divided into a plurality of beams using three low pass filters having different bandwidths.

BRIEF DESCRIPTION OF THE DRAWINGS

The above and other features and advantages of the present invention will become more apparent by describing in detail exemplary embodiments thereof with reference to the attached drawings in which:

FIGS. 9 through 11 illustrate simulated transmission/reflection performances of low pass filters (LPFs), in which FIG. 9 shows results of transmission/reflection simulation for splitting into an 86/129 GHz band beam and a 22/43 GHz band beam, FIG. 10 shows results of transmission/reflection simulation for splitting into a 22 GHz band beam and a 43 GHz band beam and FIG. 11 shows results of transmission/reflection simulation for splitting into an 86 GHz band beam and a 129 GHz band beam;

DETAILED DESCRIPTION OF THE INVENTION

According to the Korean VLBI (very long baseline interferometry) Network (hereinafter, referred to as "KVN") project, 21-meter-diameter Cassegrain antennas are disposed at three sites in Korea. The project was initiated in 2001 to provide observation facilities having a high special resolution to astronomy and earth science communities.

In the following description of the present invention, detailed explanations are given on a multi-frequency millimeter-wave VLBI receiving system capable of compensating for phase fluctuation caused by the troposphere. The multi-frequency millimeter-wave VLBI receiving system is configured to guide a beam propagated from a celestial point to 22 GHz, 43 GHz, 86 GHz, and 129 GHz band receivers. Other subjects such as design principles for imaging and power losses caused by phase errors of ellipsoidal mirrors will also be described in the following.

In millimeter and sub-millimeter wave observations by VLBI, making correct compensation for phase variations of electromagnetic waves propagating through the troposphere may be important. For this, the present invention provides a unique multi-frequency millimeter-wave VLBI receiving system capable of performing simultaneous observations in four bands such as 22 GHz, 43 GHz, 86 GHz, and 129 GHz bands, and a method of designing a quasi-optical circuit for the multi-frequency millimeter-wave VLBI receiving system.

In the present disclosure, 22 GHz, 43 GHz, 86 GHz, and 129 GHz receivers are exemplary explained. However, 2 GHz and 8 GHz receivers are also included in scope of the present invention. 22 GHz, 43 GHz, 86 GHz, and 129 GHz bands relate to astronomy, and 2 GHz and 8 GHz bands relate to geodesy. The phase of a signal at 22 GHz can be used to calibrate the phase of the same signal at higher frequency bands.

In the multi-frequency millimeter-wave VLBI receiving system, phase calibration is possible because the phase fluctuation by a given amount of water vapor increases linearly with frequency. That is, the troposphere is non-dispersive in terms of tropospheric delay fluctuation.

According to the present invention, antenna quasi optics are connected to all receivers mounted at a receiver room through a quasi-optical circuit composed of metal mirrors, dichroic filters, and corrugated horns so as to minimize power loss.

The multi-frequency millimeter-wave VLBI receiving system will now be described more fully with reference to the accompanying drawings, in which exemplary embodiments of the invention are shown.

Multi-Frequency Millimeter-Wave VLBI Receiving System

Figure 1:
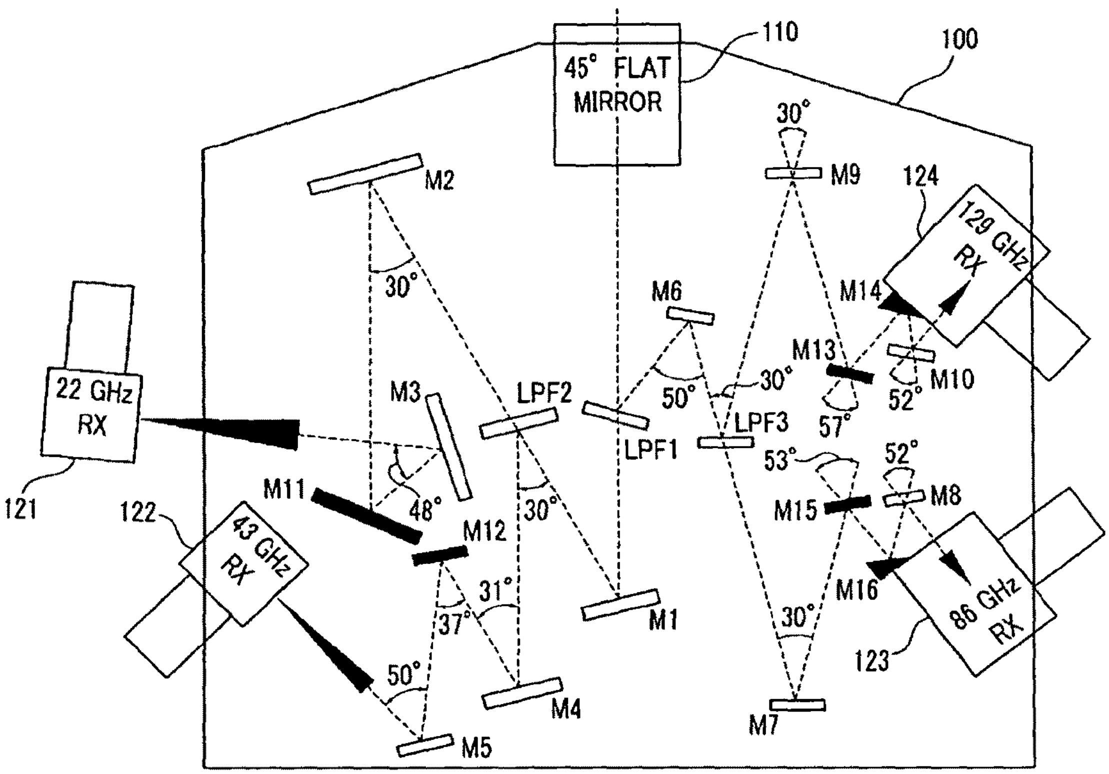
FIGS. 1 and 2 illustrate a layout of a multi-frequency millimeter-wave very long baseline interferometry (VLBI) receiving system according to an exemplary embodiment of the present invention.
Figure 2:
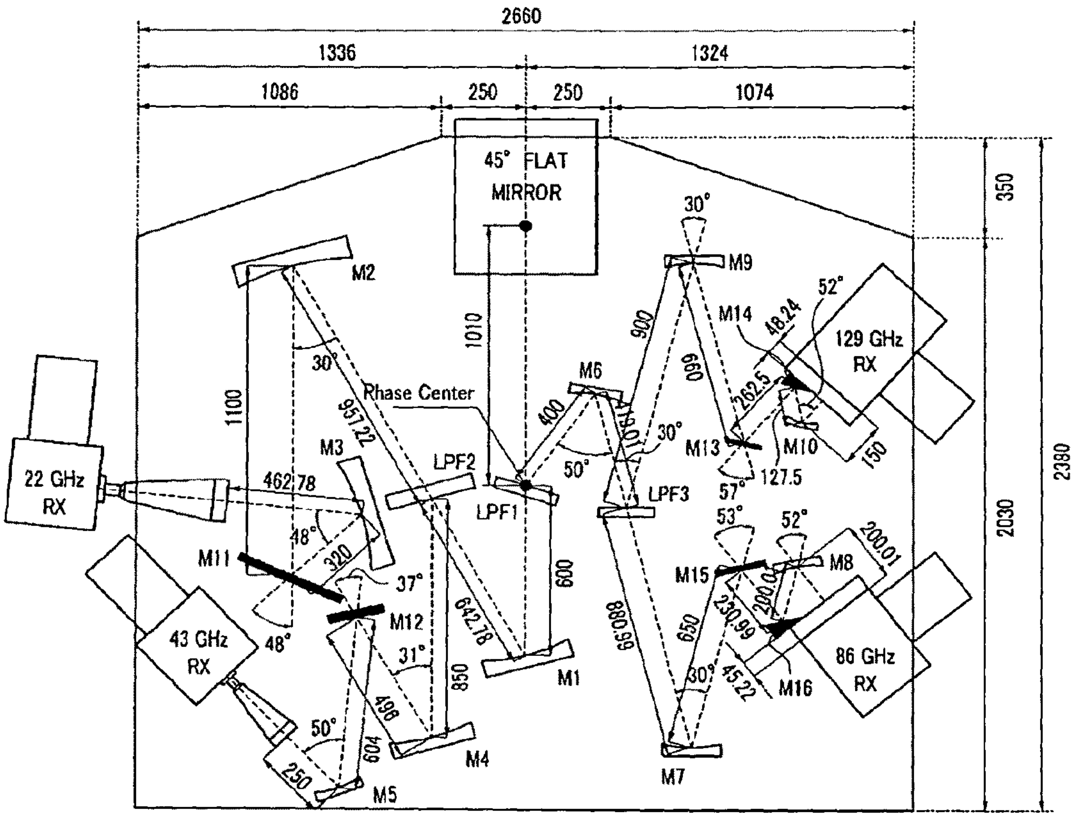

FIGS. 1 and 2 illustrate a layout of a multi-frequency millimeter-wave VLBI receiving system according to an exemplary embodiment of the present invention.

Referring to FIG. 1, the multi-frequency millimeter-wave VLBI receiving system includes 45-degree flat mirror 110, first to third low pass filters LPF1 to LPF3, first to sixteenth mirrors M1 to M16, and first to fourth receivers 121 to 124. A beam propagated from a celestial point is introduced into a receiver room 100 via the 45-degree flat mirror 110 and is divided according to frequency by the first to third low pass filters LPF1 to LPF3 having different bandwidths. Then, the divided beams are transmitted to the first to fourth receivers 121 to 124 having different bandwidths via the first to sixteenth mirrors M1 to M16. Therefore, phase variations of electromagnetic waves can be observed and compensated for at the same time.

The multi-frequency millimeter-wave VLBI receiving system can observe all frequency bands of a beam at the same time except for 2 GHz and 8 GHz bands. If necessary, a 2 GHz and 8 GHz flip-flop flat mirror (not shown) can be disposed above the 45-degree flat mirror 110 to observe 2 GHz and 8 GHz bands selectively.

Operational principles and structures of the multi-frequency millimeter-wave VLBI receiving system will be described in more detail.

First, an operation of receiving a 22 GHz band beam is as follows.

A beam propagated from a celestial point is reflected into a receiver room 100 by the 45-degree flat mirror 110 disposed at an upper side of the receiver room 100 and is directed to the first low pass filter LPF1 disposed under the 45-degree flat mirror 110. The first low pass filter LPF1 may have a bandwidth equal to or lower than 70 GHz (cutoff frequency of about 70 GHz). That is, the first low pass filter LPF1 may be used as a double reflector for reflecting frequencies of the beam higher than 70 GHz (e.g., 86 GHz and 129 GHz) and transmitting frequencies of the beam equal to or lower than 70 GHz (e.g., 22 GHz and 43 GHz).

The beam transmitted through the low pass filter LPF1 is reflected by the first mirror M1 (ellipsoidal mirror) to the second low pass filter LPF2. The second low pass filter LPF2 may have a bandwidth equal to or lower than 30 GHz (cutoff frequency of about 30 GHz). That is, the second low pass filter LPF2 may be used as a frequency-selective reflector for reflecting beam of frequency higher than 30 GHz (e.g., 43 GHz) and transmitting beam of frequency equal to or lower than 30 GHz (e.g., 22 GHz).

The beam (having a 22 GHz band) transmitted through the second low pass filter LPF2 is sequentially reflected by the second mirror M2 (ellipsoidal mirror), the eleventh mirror M11 (flat mirror), and the third mirror M3 (ellipsoidal mirror) and is directed to the first receiver 121 through a corrugate horn protruded outward form a dewar of the first receiver 121. In this way, the first receiver 121 can receive a 22 GHz band beam from a celestial point for observing and compensating for phase variations of the 22 GHz band beam.

A detailed structure of the multi-frequency millimeter-wave VLBI receiving system for receiving a 22 GHz band beam is as follows (refer to FIG. 2).

The distance between the 45-degree flat mirror 110 and the low pass filter LPF1 may be 1010 mm±10 mm (e.g., 1010 mm). The distance between the low pass filter LPF1 and the first mirror M1 (ellipsoidal mirror) may be 600 mm±10 mm (e.g., 600 mm). The distance between the first mirror M1 and the second low pass filter LPF2 may be 642.78 mm±10 mm (e.g., 642.78 mm). The distance between the second low pass filter LPF2 and the second mirror M2 (ellipsoidal mirror) may be 957.22 mm±10 mm (e.g., 957.22 mm). The distance between the second mirror M2 and the eleventh mirror M11 (flat mirror) may be 462.78 mm±10 mm (e.g., 462.78 mm). The distance between the eleventh mirror M11 and the third mirror M3 (ellipsoidal mirror) may be 320 mm±10 mm (e.g., 320 mm). The distance between the third mirror M3 and the corrugated horn of the first receiver 121 may be 462.78 mm±10 mm (e.g., 462.78 mm). The angle between incident and reflected beams at the mirror M2 may be 30°±5° (e.g., 30°), and the angle between incident and reflected beams at the third mirror M3 may be 48°±5° (e.g., 48°).

Next, an operation of receiving a 43 GHz band beam is as follows.

Similarly, a beam propagated from a celestial point is reflected into the receiver room 100 by the 45-degree flat mirror 110 disposed at the upper side of the receiver room 100 and is directed to the first low pass filter LPF1 disposed under the 45-degree flat mirror 110.

The beam transmitted through the low pass filter LPF1 is reflected by the first mirror M1 (ellipsoidal mirror) to the second low pass filter LPF2 where a 43 GHz band of the beam is reflected. The 43 GHz band beam reflected by the second low pass filter LPF2 is sequentially reflected by the fourth mirror M4 (ellipsoidal mirror), the twelfth mirror M12 (flat mirror), and the fifth mirror M5 (ellipsoidal mirror) and is directed to the second receiver 122 through a corrugate horn protruded outward form a dewar of the second receiver 122. In this way, the second receiver 122 can receive a 43 GHz band beam from a celestial point for observing and compensating for phase variations of the 43 GHz band beam.

A detailed structure of the multi-frequency millimeter-wave VLBI receiving system for receiving a 43 GHz band beam is as follows (refer to FIG. 2).

The distance between the second low pass filter LPF2 and the fourth mirror M4 (ellipsoidal mirror) may be 850 mm±10 mm (e.g., 850 mm). The distance between the fourth mirror M4 and the twelfth mirror M12 (flat mirror) may be 496 mm±10 mm (e.g., 496 mm). The distance between the twelfth mirror M12 and the fifth mirror M5 (ellipsoidal mirror) may be 604 mm±10 mm (e.g., 604 mm). The distance between the fifth mirror M5 and the corrugated horn of the second receiver 122 may be 250 mm±10 mm (e.g., 250 mm). The angle between incident and reflected beams at the second low pass filter LPF2 may be 30°+5° (e.g., 30°). The angle between incident and reflected beams at the fourth mirror M4 may be 31°±5° (e.g., 31°). The angle between incident and reflected beams at the twelfth mirror M12 may be 37°±5° (e.g., 37°).

The angle between incident and reflected beams at the fifth mirror M5 may be 50°±5° (e.g., 50°).

Next, an operation of receiving an 86 GHz band beam will be explained.

Similarly, a beam propagated from a celestial point is reflected into the receiver room 100 by the 45-degree flat mirror 110 disposed at the upper side of the receiver room 100 and is directed to the first low pass filter LPF1, which is disposed under the 45-degree flat mirror 110 and has a bandwidth equal to or lower than 70 GHz (cutoff frequency of about 70 GHz).

The beam reflected by the low pass filter LPF1 is reflected further by the sixth mirror M6 (ellipsoidal mirror) to the third low pass filter LPF3. The third low pass filter LPF3 may have a bandwidth equal to or lower than 108 GHz (cutoff frequency of about 108 GHz). That is, the third low pass filter LPF3 may be used as a double reflector for reflecting frequencies of the beam higher than 108 GHz (e.g., 129 GHz) and transmitting frequencies of the beam equal to or lower than 108 GHz (e.g., 86 GHz).

An 86 GHz band beam transmitted through the third low pass filter LPF3 is sequentially reflected by the seventh mirror M7 (ellipsoidal mirror), the fifteenth mirror M15 (flat mirror), the sixteenth mirror M16 (flat mirror), and the eighth mirror M8 (ellipsoidal mirror). Then, the 86 GHz band beam is directed to the third receiver 123. At this time, the 86 GHz band beam reflected from the eighth mirror M8 is directed into the third receiver 123 through a corrugated horn.

In this way, the third receiver 123 can receive an 86 GHz band beam from a celestial point for observing and compensating for phase variations of the 86 GHz band beam.

A detailed structure of the multi-frequency millimeter-wave VLBI receiving system for receiving a 86 GHz band beam is as follows (refer to FIG. 2).

The distance between the low pass filter LPF1 and the sixth mirror M6 (ellipsoidal mirror) may be 400 mm±10 mm (e.g., 400 mm). The distance between the sixth mirror M6 and the third low pass filter LPF3 may be 419.01 mm±10 mm (e.g., 419.01 mm). The distance between the third low pass filter LPF3 and the seventh mirror M7 (ellipsoidal mirror) may be 880.99 mm±10 mm (e.g., 880.99 mm). The distance between the seventh mirror M7 and the fifteenth mirror M15 (flat mirror) may be 650 mm±10 mm (e.g., 650 mm). The distance between the fifteenth mirror M15 and the sixteenth mirror M16 (flat mirror) may be 230.99 mm±10 mm (e.g., 230.99 mm). The distance between the sixteenth mirror M16 and the eighth mirror M8 (ellipsoidal mirror) may be 200.01 mm±10 mm (e.g., 200.01 mm). The distance between the eighth mirror M8 and the corrugated horn of the third receiver 123 may be 200.01 mm±10 mm (e.g., 200.01 mm). In addition, the angle between incident and reflected beams at the sixth mirror M6 may be 50°±5° (e.g., 50°). The angle between incident and reflected beams at the seventh mirror M7 may be 30°±5° (e.g., 30°). The angle between incident and reflected beams at the fifteenth mirror M15 may be 53°±5° (e.g., 53°). The angle between incident and reflected beams at the eighth mirror M8 may be 52°±5° (e.g., 52°).

Next, an operation of receiving an 86 GHz band beam is as follows.

Similarly, a beam propagated from a celestial point is reflected into the receiver room 100 by the 45-degree flat mirror 110 disposed at the upper side of the receiver room 100 and is directed to the first low pass filter LPF1, which is disposed under the 45-degree flat mirror 110 and has a bandwidth equal to or lower than 70 GHz (cutoff frequency of about 70 GHz).

The beam reflected by the low pass filter LPF1 is reflected further by the sixth mirror M6 (ellipsoidal mirror) to the third low pass filter LPF3. The third low pass filter LPF3 may have a bandwidth equal to or lower than 108 GHz (cutoff frequency of about 108 GHz). That is, the third low pass filter LPF3 may be used as a double reflector for reflecting frequencies of the beam higher than 108 GHz (e.g., 129 GHz) and transmitting frequencies of the beam equal to or lower than 108 GHz (e.g., 86 GHz).

An 86 GHz band beam transmitted through the third low pass filter LPF3 is sequentially reflected by the seventh mirror M7 (ellipsoidal mirror), the fifteenth mirror M15 (flat mirror), the sixteenth mirror M16 (flat mirror), and the eighth mirror M8 (ellipsoidal mirror). Then, the 86 GHz band beam is directed to the third receiver 123. At this time, the 86 GHz band beam reflected from the eighth mirror M8 is directed into the third receiver 123 through a corrugated horn disposed in a dewar of the third receiver 123.

In this way, the third receiver 123 can receive an 86 GHz band beam from a celestial point for observing and compensating for phase variations of the 86 GHz band beam.

A detailed structure of the multi-frequency millimeter-wave VLBI receiving system for receiving a 86 GHz band beam is as follows (refer to FIG. 2).

The distance between the first low pass filter LPF1 and the sixth mirror M6 (ellipsoidal mirror) may be 400 mm±10 mm (e.g., 400 mm). The distance between the sixth mirror M6 and the third low pass filter LPF3 may be 419.01 mm±10 mm (e.g., 419.01 mm). The distance between the third low pass filter LPF3 and the seventh mirror M7 (ellipsoidal mirror) may be 880.99 mm±10 mm (e.g., 880.99 mm). The distance between the seventh mirror M7 and the fifteenth mirror M15 (flat mirror) may be 650 mm±10 mm (e.g., 650 mm). The distance between the fifteenth mirror M15 and the sixteenth mirror M16 (flat mirror) may be 230.99 mm±10 mm (e.g., 230.99 mm). The distance between the sixteenth mirror M16 and the eighth mirror M8 (ellipsoidal mirror) may be 200.01 mm±10 mm (e.g., 200.01 mm). The distance between the eighth mirror M8 and the corrugated horn of the third receiver 123 may be 200.01 mm±10 mm (e.g., 200.01 mm). In addition, the angle between incident and reflected beams at the sixth mirror M6 may be 50°±5° (e.g., 50°). The angle between incident and reflected beams at the seventh mirror M7 may be 30°±5° (e.g., 30°). The angle between incident and reflected beams at the fifteenth mirror M15 may be 53°±5° (e.g., 53°). The angle between incident and reflected beams at the eighth mirror M8 may be 52°±5° (e.g., 52°).

Finally, an operation of receiving a 129 GHz band beam is as follows.

Similarly, a beam propagated from a celestial point is reflected into the receiver room 100 by the 45-degree flat mirror 110 disposed at the upper side of the receiver room 100 and is directed to the first low pass filter LPF1, which is disposed under the 45-degree flat mirror 110 and has a bandwidth equal to or lower than 70 GHz (cutoff frequency of about 70 GHz). The beam reflected by the low pass filter LPF1 is reflected by the sixth mirror M6 (ellipsoidal mirror) to the third low pass filter LPF3. As explained above, the third low pass filter LPF3 has a bandwidth equal to or lower than 108 GHz (cutoff frequency of about 108 GHz).

A 129 GHz band beam reflected from the third low pass filter LPF3 is sequentially reflected by the ninth mirror M9 (ellipsoidal mirror), the thirteenth mirror M13 (flat mirror), the fourteenth mirror M14 (flat mirror), and the tenth mirror M10 (ellipsoidal mirror). The 129 GHz band beam is directed into the fourth receiver 124. At this time, the 129 GHz band beam reflected from the tenth mirror M10 is directed into the fourth receiver 124 through a corrugated horn.

In this way, the fourth receiver 124 can receive a 129 GHz band beam from a celestial point for observing and compensating for phase variations of the 129 GHz band beam.

A detailed structure of the multi-frequency millimeter-wave VLBI receiving system for receiving a 129 GHz band beam is as follows (refer to FIG. 2).

The distance between the third low pass filter LPF3 and the ninth mirror M9 may be 900 mm±10 mm. The distance between the ninth mirror M9 (ellipsoidal mirror) and the thirteenth mirror M13 (flat mirror) may be 660 mm±10 mm. The distance between the thirteenth mirror M13 and the fourteenth mirror M14 (flat mirror) may be 262.5 mm±10 mm. The distance between the fourteenth mirror M14 and the tenth mirror M10 (ellipsoidal mirror) may be 127.5 mm±10 mm, and the distance between the tenth mirror M10 and the corrugated horn of the fourth receiver 124 may be 150 mm±10 mm. In addition, the angle between incident and reflected beams at the sixth mirror M6 (ellipsoidal mirror) may be 50°±5° (e.g., 50°). The angle between incident and reflected beams at the third low pass filter LPF3 may be 30°±5° (e.g., 30°). The angle between incident and reflected beams at the ninth mirror M9 (ellipsoidal mirror) may be 30°±5° (e.g., 30°). The angle between incident and reflected beams at the thirteenth mirror M13 may be 57°±5° (e.g., 57°). The angle between incident and reflected beams at the tenth mirror M10 may be 52°±5° (e.g., 52°).

As described above, in the multi-frequency millimeter-wave VLBI receiving system of the present invention, the 45-degree flat mirror 110 directs a beam propagated from a celestial point into the receiver room 100, and the beam is divided according to the frequency of the beam by the first to third low pass filters LPF1 to LPF3 having different bandwidths. The divided beams are reflected by the first to sixteenth mirrors M1 to M16 to the transmitted to the first to fourth receivers 121 to 124 having frequency bands of 22 GHz, 43 GHz, 86 GHz, and 129 GHz, respectively, so that phase variations of the beams can be simultaneously observed and compensated for. In addition, a 2 GHz and 8 GHz flip-flop flat mirror (not shown in FIGS. 1 and 2) may be disposed above the 45-degree flat mirror 110. Lengths and spacing between the first to third low pass filters LPF1 to LPF3 and the first to sixteenth mirrors M1 to M16 are given in millimeters, and angles between them are given in degrees.

The multi-frequency millimeter-wave VLBI receiving system of the present invention can make simultaneously observations in all bands except for 2 GHz and 8 GHz bands as listed in Table 1 below. As described above, observations in 2 GHz and 8 GHz bands can be selectively performed by disposing a 2 GHz and 8 GHz flip-flop flat mirror (not shown) above the 45-degree flat mirror 110.

TABLE 1

Band plan & parameters of KVN antenna optics.

| | Specification |
|---|---|
| RF bands | 21-23, 42-44, 84-88, 127-131 GHz |
| Subreflector diameter | 2250 mm |
| Distance bt. subreflector vertex-geometrical focus | 8415 mm |
| Target edge taper | 17 dB (λ-independent) |

In the multi-frequency millimeter-wave VLBI receiving system of the present invention, 30 GHz, 70 GHz, and 108 GHz band beams can be received using the three low pass filters LPF1 to LPF3.

The first to third low pass filters LPF1 to LPF3 of the present invention may be formed through an etching process. The first to third low pass filters LPF1 to LPF3 may be formed of multi-layer metal meshes separated by optimal air gaps.

Beams passing through the first to third low pass filters LPF1 to LPF3 should have a large size. Furthermore, the first to fourth receivers 121 to 124 are configured to prevent cross-polarization to provide a dual polarization observation in each band.

In the multi-frequency millimeter-wave VLBI receiving system of the present invention, about 17-dB edge illumination is used due to Cassegrain telescope optics. In detail, 17 dB edge taper higher than 12 dB usually employed for standard Cassegrain antenna optics is selected to obtain 2-% spillover loss and high illumination efficiency as compared with a conventional Cassegrain quasi optics having a scalar horn.

The structure of the multi-frequency millimeter-wave VLBI receiving system illustrated in FIG. 2 is an exemplary structure ideally designed in accordance with the present invention. The structure is designed by iteratively using quasi-optical theories rather than using a calculation-intensive physical quasi-optical method.

Beams incident onto the first to fourth receivers 121 to 124 are originated from the 45-degree flat mirror 110 disposed at an upper end portion of the receiver room 100.

The first low pass filters LPF1 (dichroic, cutoff frequency of about 70 GHz) reflects a beam having a frequency higher than 70 GHz (e.g., 86 GHz and 129 GHz) and transmits a beam having a frequency equal to or lower than 70 GHz (e.g., 22 GHz and 43 GHz). The second low pass filters LPF2 (dichroic, cutoff frequency of about 30 GHz) reflects a beam having a frequency higher than 30 GHz (e.g., 43 GHz) and transmits a beam having a frequency equal to or lower than 30 GHz (e.g., 22 GHz). The third low pass filters LPF3 (dichroic, cutoff frequency of about 108 GHz) reflects a beam having a frequency higher than 108 GHz (e.g., 129 GHz) and transmits a beam having a frequency equal to or lower than 108 GHz (e.g., 86 GHz). Therefore, a beam can be split into 22 GHz, 43 GHz, 86 GHz, and 129 GHz beams by the first to third low pass filters LPF1 to LPF3.

In this way, when a beam is guided through the quasi optics, a frequency band of the beam higher than the cutoff frequency of each of low pass filters LPF1 to LPF3 is reflected twice, effectively avoiding transmission loss by the first to third low pass filters.

A beam incident into the receiver room 100 is split into 22 GHz, 43 GHz, 86 GHz, and 129 GHz band beams and guided to the first to fourth receivers 121 to 124 through optical passages each composed of two low pass filters, three offset ellipsoidal mirrors, and one or two flat mirrors as shown in FIGS. 1 and 2. The corrugated horns of the 22 GHz and 43 GHz receivers 121 and 122 are disposed at the outsides of the dewars of the receivers 121 and 122 but the corrugated horns of the 86 GHz and 129 GHz receivers 123 and 124 are disposed inside the dewars of the receivers 123 and 124.

Figures 3, 4:
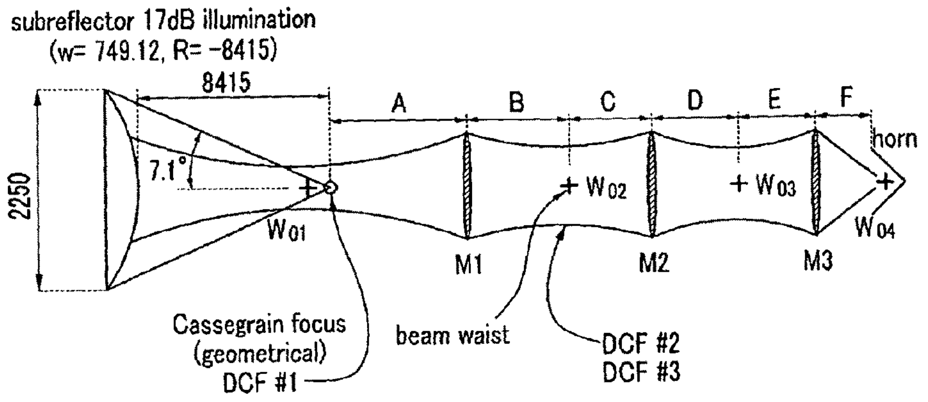
FIG. 3 illustrates a schematic diagram of a multi-frequency millimeter-wave VLBI receiving system according to an exemplary embodiment of the present invention.
FIG. 4 illustrates beam parameters of a multi-frequency millimeter-wave VLBI receiving system according to an exemplary embodiment of the present invention.

FIGS. 3 and 4 illustrate a schematic diagram and beam parameters of a multi-frequency millimeter-wave VLBI receiving system according to exemplary embodiments of the present invention.

Referring to FIG. 3, DCFs denote dichroic filters; M1, M2, and M3 denote three focusing mirrors in the optical chain of each band; and $W_{01}$, $W_{02}$, $W_{03}$, and $W_{04}$ denote beam waists in the optical chain.

Proper designing of a plurality of receivers may require tedious and iterative works. Thus, the present invention provides a relatively simple, very intuitive designing method.

The basic principle of imaging beam waveguides is already well known. However, it is difficult to predict phase front curvature in an intuitive manner although given parameters follow normal imaging rules of beam optics. Therefore, it is not easy to apply this principle in an optical chain composed of several components. Properties of quasi-optical Gaussian beams used in the design come from the so-called Gaussian Beam Telescope (hereafter, referred to as GBT).

A GBT configuration can be defined by the waist-to-waist condition of two ideal lenses: the waist of an input beam is located at a distance of the focal length of the first lens, and the input beam is imaged at another waist located at the focus of the other side of the second lens. For this, the two lenses may be spaced by the sum of their focal lengths (refer to FIG. 3).

Figure 5:
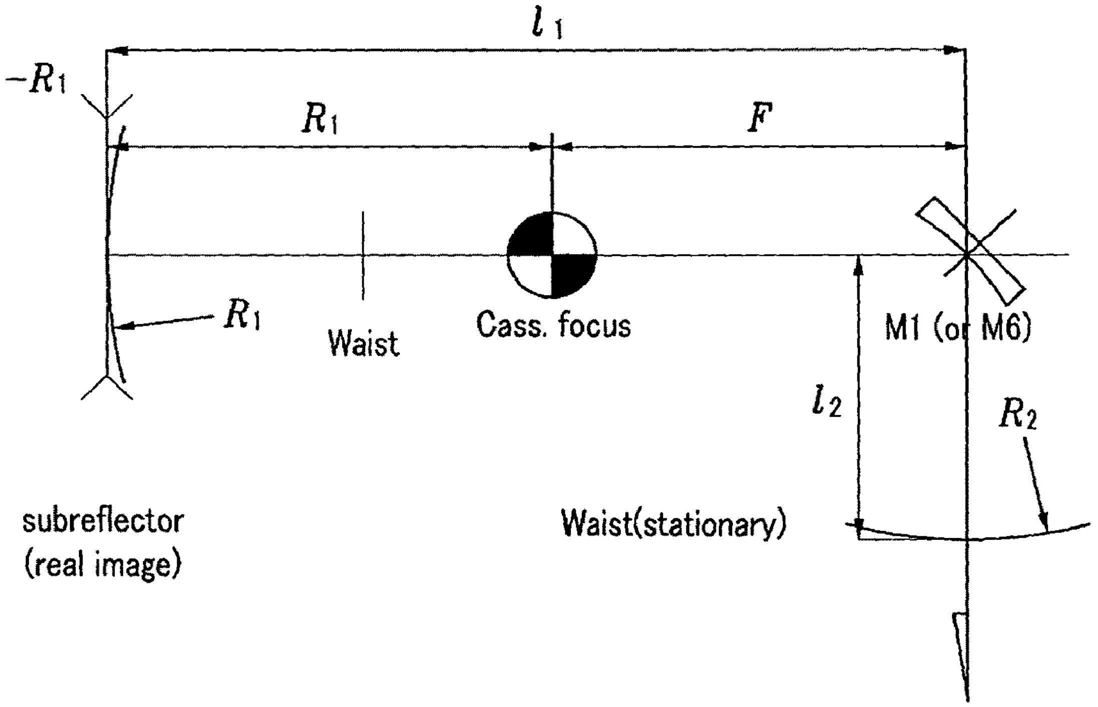
FIG. 5 illustrates an image subreflector field with respect to a beam waist formed by a mirror M1 (or M6) which represents a geometric focus of a Cassegrain telescope.

If the first lens is located away from the nominal geometrical focus of a given Cassegrain antenna by the focal length of the first lens, an image of a subreflector is formed at an opposite side located away from the first lens by a distance of $I_2$, and an image corresponding to the image is formed at a beam waist (where the radius $R_2$ of phase curvature becomes infinite) as shown in FIG. 5.

In FIG. 5, $I_1$, $I_2$, and f denote the distance between an input beam and a mirror M1 (or M6), the imaging distance of the beam from the mirror M1, and the focal length of the mirror M1, respectively. The image waist is located farther than the focal length f of the mirror M1

$R_1$ denotes the radius of phase curvature of the input beam. When the phase front is concave to the right in FIG. 5, the field of the subreflector and $R_1$ are treated as negative (−).

$$l_1 = f - R_1 \qquad \text{[Equation 1]}$$

$$l_2 = -\frac{l_1}{R_1}\cdot f$$

$$R_2 = \frac{l_2}{1+\frac{l_1}{l_2}\cdot\frac{f}{R_1}} = \frac{l_2}{1+\frac{l_1-f}{R_1}} \to \infty$$

In the case where an optical chain of a GBT is constructed using properties of three lenses, the space between second and third lenses can be easily adjusted to achieve a frequency-independent illumination taper over the primary reflector with no interference with other optical chains of other bands.

By using this designing method more practicably, an angled zero-flare can be easily obtained for a beam waist near an aperture over a required bandwidth.

FIG. 5 illustrates an image subreflector field with respect to a beam waist formed by the mirror M1 (or M6) which represents a geometric focus of a Cassegrain telescope. The waist near Cassegrain focus generally moves towards the subreflector with increasing frequency while the beam waist following the mirror M1 (or M6) is stationary with respect to frequency.

Ellipsoidal Mirrors

In optical chains, mirrors M1 and M6 are used as common re-focusers for 22/43 GHz and 86/129 GHz branches.

Generally, the shape of an ellipsoidal mirror determines the radii of curvature of incident and reflected beams, angles of incident and reflected beams, beam incidence angle at a mid-frequency of an operation band.

Since the operation bandwidths of mirrors M1 and M6 are relatively wide, phase mismatch loss expected to be determined by the shapes of the mirrors M1 and M6 was investigated. For reference, the surface height difference of the shape of the first mirror M1 (obtained from 22 and 43 GHz radii of curvature) which is normalized to a wavelength of 22

Figure 6:
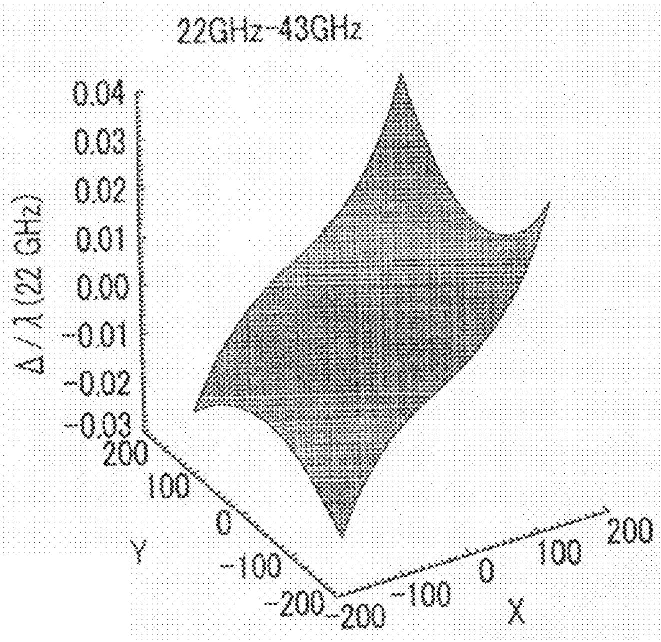
FIGS. 6 and 7 illustrate height differences of shapes of mirrors M1 and M6 defined by beam parameters at specific frequencies.
Figure 7:
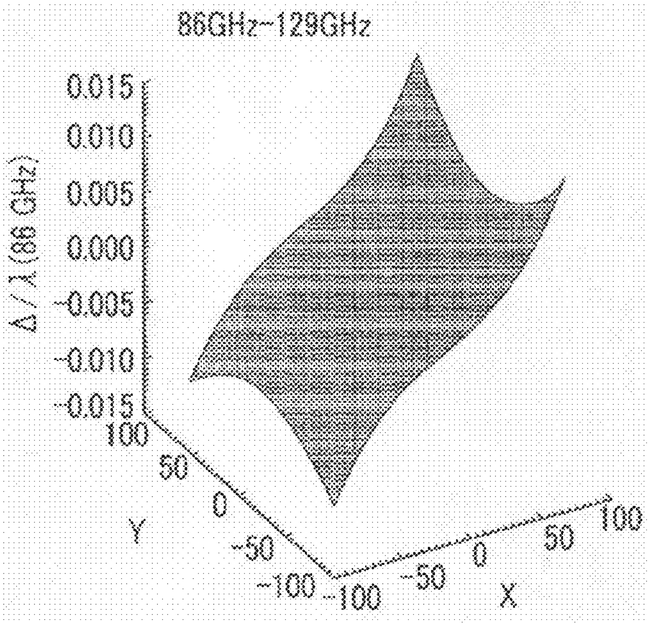

GHz, and the similar surface height difference of the shape of the sixth mirror M6 (obtained from 86 and 129 GHz radii of curvature) which is normalized to a wavelength of 86 GHz are shown in FIGS. 6 and 7.

FIGS. 6 and 7 illustrate the height differences of the shapes of the first and sixth mirrors M1 and M6 determined from the beam parameters at specific frequencies. In FIG. 6, the height (in the Z axis) of the shape marked by "22 GHz-43 GHz" is determined from 43 GHz beam parameters extracted from parameters found from 22 GHz beam parameters. The X and Y axes denote coordinates of the surface of each mirror in millimeters. The difference values are normalized with respect to the wavelength as indicated.

As shown in the graphs of FIGS. 6 and 7, the mirror shape at the center frequency (32.5 GHz in the case of the first mirror M1 and 107.5 GHz in the case of the sixth mirror M6) is expected to be determined by the average of height differences between both bands.

Figure 8:
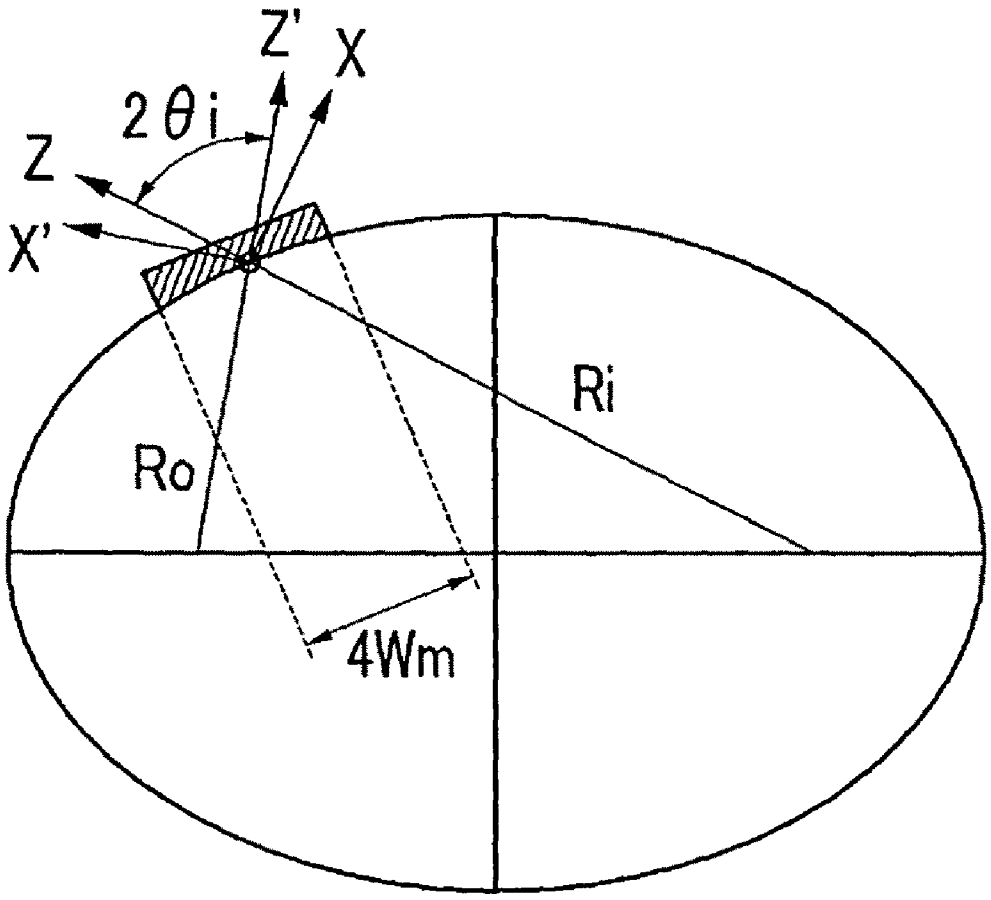
FIG. 8 illustrates the geometry of an ellipsoidal mirror according to an embodiment of the present invention.

FIG. 8 illustrates the geometry of an ellipsoidal mirror. In FIG. 8, $R_i$ and $R_o$ denote radii of curvature of incident and reflected beams, respectively. Wm denotes the beam radius of a mirror surface, and θi denotes an incident angle.

In the current embodiment of the present invention, an analytical formula is used to evaluate mismatch. Referring to FIG. 8, phase mismatch on the surface of the ellipsoidal mirror can be expressed by first order approximation.

$$\Delta\phi_{total} = -\frac{\pi r^2}{\lambda}\cdot z\left(\frac{1}{R_1'^2} - \frac{1}{R_1^2} + \frac{1}{R_2'^2} - \frac{1}{R_2^2} + \frac{1}{f}\left(\frac{1}{R_2} - \frac{1}{R_2'}\right)\right) \quad \text{[Equation 2]}$$

In Equation 2, $R_1$ and $R_2$ denote the radii of curvature of incident and reflected beams of a mirror at a mid frequency while $R_1'$ and R2' denote those of beams at 22 or 43 GHz for the mirror M1, and 86 or 129 GHz for mirror M6. Fractional loss caused by such mismatch can be expressed by applying coupling integral as in Equation 3.

$$1 - G = \left[\frac{\pi}{\lambda}\omega_m^3\tan\theta_i\cdot\left(\frac{1}{R_1'^2} - \frac{1}{R_1^2} + \frac{1}{R_2'^2} - \frac{1}{R_2^2} + \frac{1}{f}\left(\frac{1}{R_2} - \frac{1}{R_2'}\right)\right)\right]^2 \quad \text{[Equation 3]}$$

Table 2 given below shows estimated losses of the mirrors M1 and M6 at the center frequency of each band when the shape of the mirror M1 is determined at a mean frequency of 32.5 GHz and the shape of the mirror M6 is determined at 107.5 GHz. This estimation shows that the shapes determined at center frequencies allows transfer of power of a fundamental Gaussian beam without generating large loss due to phase mismatch.

TABLE 2

| GHz | $R'_1$ ($R_i$) | $R'_2$ ($R_0$) | $\omega_m$ | $\theta_i$ | Fractional loss (dB) |
|---|---|---|---|---|---|
| 22 | 1102.93 | −1315.81 | 76.44 | 15 | −33.97 |
| 43 | 737.72 | −3213.92 | 76.44 | 15 | −30.44 |
| 86 | 451.03 | −3535.43 | 38.04 | 25 | −36.94 |
| 129 | 422.76 | −7431.00 | 38.04 | 25 | −37.75 |

Low Pass Filter

Free-space filters reflect signals in their stop bands and transmit in their pass bands in the same way as normal microwave filters operate.

For optimal performance, beam incidence angles need to be restricted less than 20°, and as mentioned above, beams passing through the filters should have a large radius to minimize components in their angular spectrums.

Figure 9:
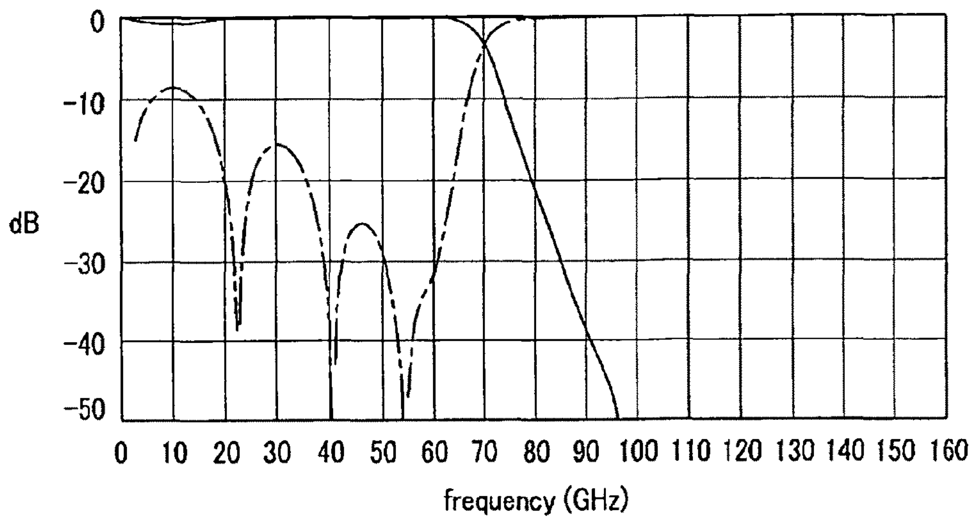

Results of simulated performances of filters are shown in FIG. 9.

Figure 10:
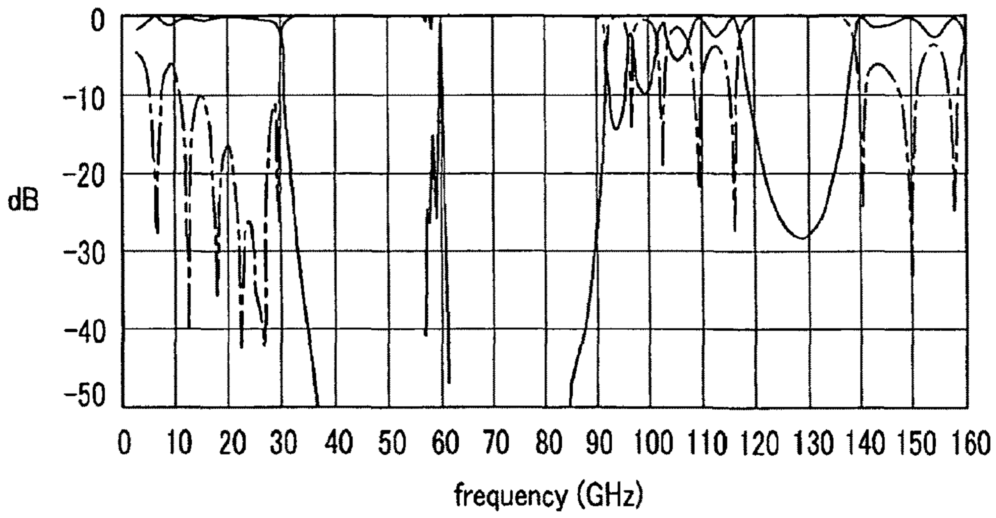
Figure 11:
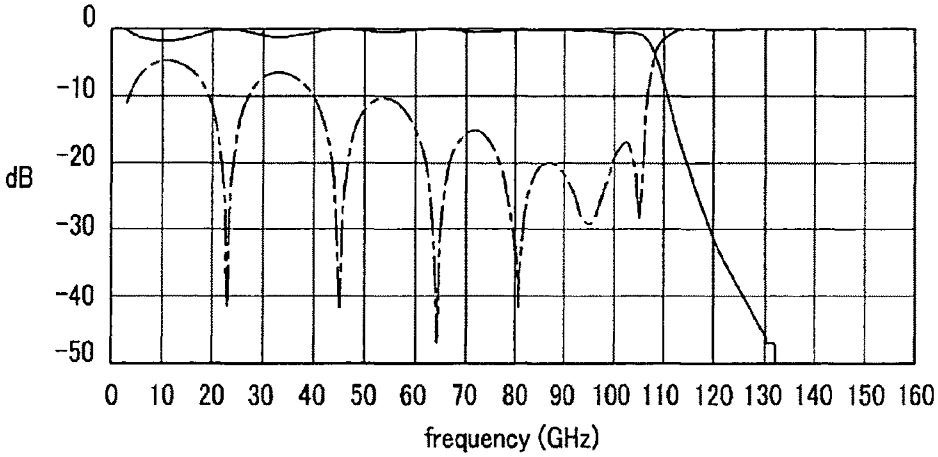

FIGS. 9 through 11 shows simulated transmission/reflection performances of low pass filters (LPFs). FIG. 9 shows results of transmission/reflection simulation for splitting into an 86/129 GHz band beam and a 22/43 GHz band beam. FIG. 10 shows results of transmission/reflection simulation for splitting into a 22 GHz band beam and a 43 GHz band beam. FIG. 11 shows results of transmission/reflection simulation for splitting into an 86 GHz band beam and a 129 GHz band beam. In FIGS. 9 through 11, solid lines represent transmission, and dash-dot lines represent reflection.

The simulated transmission and reflection losses of all LPFs (LPF1, LPF2, and LPF3) are 0.3 dB or lower. Such a loss does not result in a significant degradation of receiver noise temperature.

Installation Tolerance of Optical Plate

In the multi-frequency millimeter-wave VLBI receiving system of the present invention, a large optical plate (for example, less than 2.4 m×2.7 m) is necessary, and the optical plate is properly installed in the receiver room 100 at a mechanical frame provided to transport a whole plate.

Since the optical plate can be installed at a lateral side and tilted with respect to a beam from an antenna, although it is assumed that all optical components are properly installed on the optical plate, allowable maximum tolerances should be regulated based on power loss criterion as shown in Table 3 below. Beam connection concept is set at the highest band where the degradation of power coupling is generally worst.

TABLE 3

| Offset to antenna beam | Tolerances at 129 GHz |
|---|---|
| Axial | ±10 mm (1% loss) |
| Lateral | ±1.5 mm (1% loss) |
| Tilt | ±0.5° (1% loss) |

Truncation level at all the optical components is set at 4 times the relevant 1/e amplitude beam radii (a 35 dB taper for a Gaussian beam) to reduce truncation and diffraction losses. In addition, to reduce cross-polarization and distortion of a beam that ellipsoidal mirrors intrinsically generate, beam incidence angles are set to be less than 26°.

Embodiments

The multi-frequency millimeter-wave VLBI receiving system of the present invention is configured to compensate for phase fluctuation caused by the atmosphere for carrying out millimeter-wave VLBI reliably and perform simultaneous observations in a plurality of frequency bands.

To perform simultaneous observations in a plurality of millimeter-wave bands, a quasi optical system having a complicated structure is required. In an optimally designed quasi optical system, many quasi optical devices are disposed at predetermined intervals in a given space of a receiver room based on iterative calculations. Therefore, in the case of a quasi optical system such as the KVN quasi optical system including many quasi optical devices (particularly, ellipsoidal mirrors), specific design rules are necessary to determine installation positions of the quasi optical devices. Therefore, the present invention provides an efficient design method for a complicated quasi optical system, and an optimally designed quasi optical system.

Hereinafter, a method of fabricating a multi-frequency millimeter-wave VLBI receiving system will be described according to embodiments of the present invention.

Fabrication of Receiver Plate

A quasi optical system having a very complicated structure is necessary to perform observations in multiple frequency bands such as 22 GHz, 43 GHz, 86 GHz, and 129 GHz bands as described above, and various quasi optical components constituting the optical circuit of the quasi optical system are installed in accordance with the following requirements.

a) Quasi optical components are mainly made of aluminum, and a receiver plate having a very strong structure is necessary for support weights of first to fourth receivers 121 to 124.

b) Since the first to fourth receivers 121 to 124 and other complicated components of the multi-frequency millimeter-wave VLBI receiving system are installed on the single receiver plate, the thickness variation and distortion of the receiver plate should be minimized for precise beam transmissions between the components.

c) Since the receiver plate is typically installed in a receiver room and be movable, the receiver plate should be made with light materials.

In the current embodiment, to satisfy the above-described requirements, the receiver plate is fabricated in a sandwich structure by disposing a wood material between two 5-mm aluminum plates. The wood material may be a strong balsa wood material capable of supporting the weights of the components of the multi-frequency millimeter-wave VLBI receiving system such as the first to fourth receivers 121 to 124.

Figure 12:
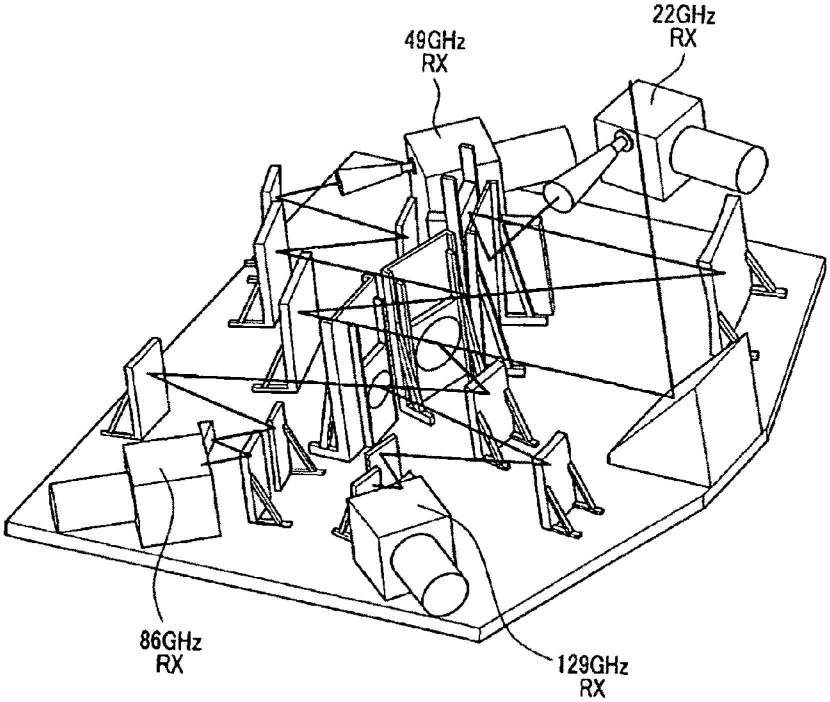
FIG. 12 illustrates a quasi optical model of a multi-frequency millimeter-wave VLBI receiving system according to an embodiment of the present invention.

FIG. 12 illustrates an exemplary receiver plate designed and fabricated according to an embodiment of the present invention.

Fabrication of Mode Selector

As described above, 22 GHz, 43 GHz, 86 GHz, and 129 GHz band signals focused on Cassegrain focuses are separated by observation mode selectors to respective beam paths. To minimize losses between the observation mode selectors and quasi optical components, it may be necessary to select a beam path according to an observation band selected by an operator (observer). Therefore, the observation mode selectors are installed in the quasi optical circuit.

The observation mode selectors include quasi-optical low pass filters capable of selecting 22 GHz, 43 GHz, 86 GHz, and 129 GHz band signals, flat mirrors, and free space surfaces through which the beam signals can pass. For example, operations of first to third observation mode selectors installed at the Cassegrain focuses are as follows.

The first to third observation mode selectors include low pass filters, respectively, for separating 22 GHz, 43 GHz, 86 GHz, and 129 GHz band signals focused on the Cassegrain focuses.

In detail, the first observation-mode selector includes a first low pass filters LPF1. The first low pass filters LPF1 transmits low frequency components (22 GHz and 43 GHz) but reflects high frequency components (86 GHz and 129 GHz). The second observation-mode selector includes a second low pass filter LPF2. The second low pass filter LPF2 transmits a 22 GHz band signal and reflects a 43 GHz band signal. The third observation-mode selector includes a third low pass filter LPF3. The third low pass filter LPF3 transmits an 86 GHz band signal and reflects a 129 GHz band signal.

If an observer wants to observe 22 GHz and 86 GHz band signals simultaneously, the observer can operate only the first observation mode selector and restrict operations of the second and third observation mode selectors to minimize loss at the observation mode selectors.

Figure 13:
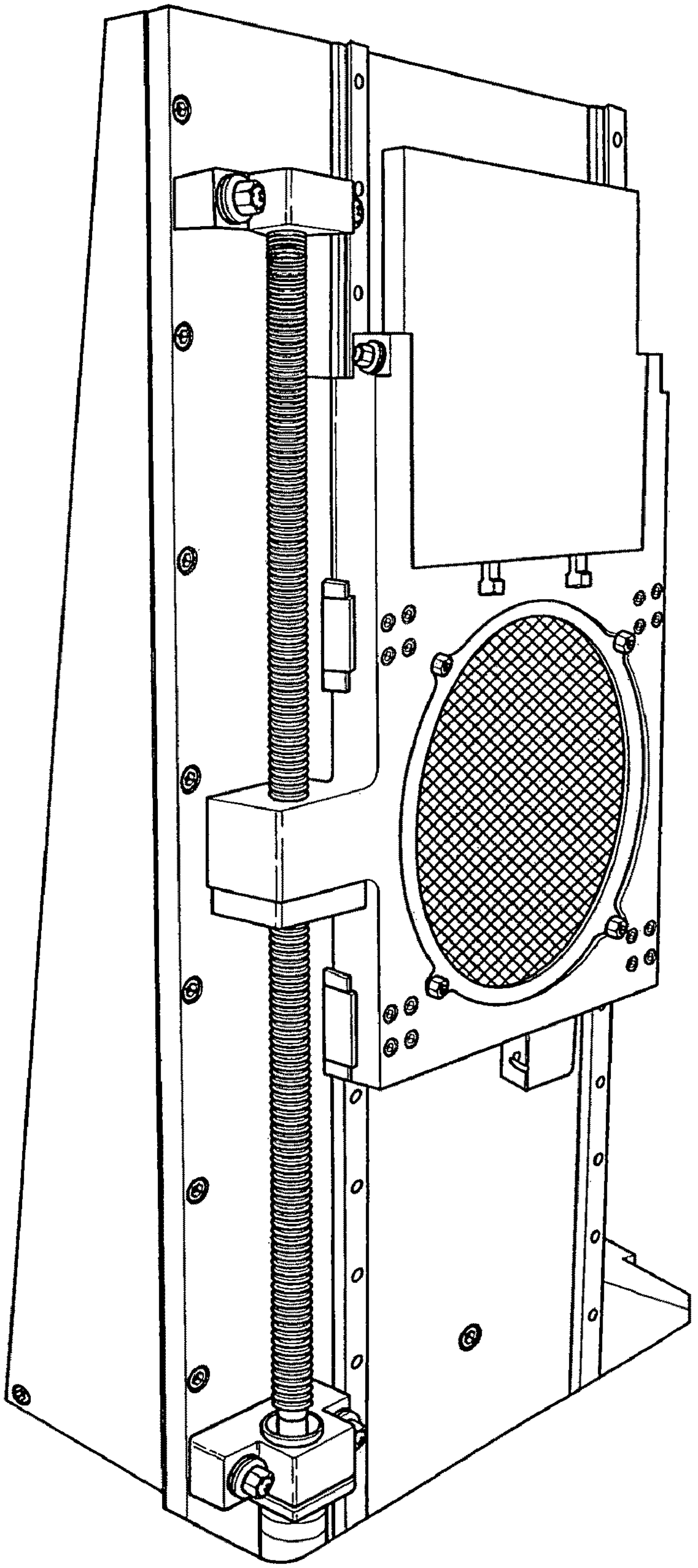
FIG. 13 illustrates an exemplary third observation mode selector fabricated according to the current embodiment.

In addition, an observer can observe 43 GHz and 129 GHz band signals by installing a low pass filter at the first observation mode selector and flat mirrors at the second and third observation mode selectors. FIG. 13 illustrates an exemplary observation mode selector fabricated according to the current embodiment.

Fabrication of Low Pass Filter

The low pass filters used in the multi-frequency millimeter-wave VLBI receiving system of the present invention have a conventional quasi optical filter structure including a conductor mesh grid structure disposed on a thin dielectric substrate. Since the observation frequencies of the multi-frequency millimeter-wave VLBI receiving system are 22 GHz, 43 GHz, 86 GHz, and 129 GHz frequencies, wide-band filters are required. Therefore, the low pass filters are formed by stacking dielectric mesh grid structures (multiple layers). Before fabrication, desired characteristics are theoretically analyzed for the multi-frequency millimeter-wave VLBI receiving system. These theoretical characteristics are shown in FIGS. 14, 15 and 16.

Figure 14:
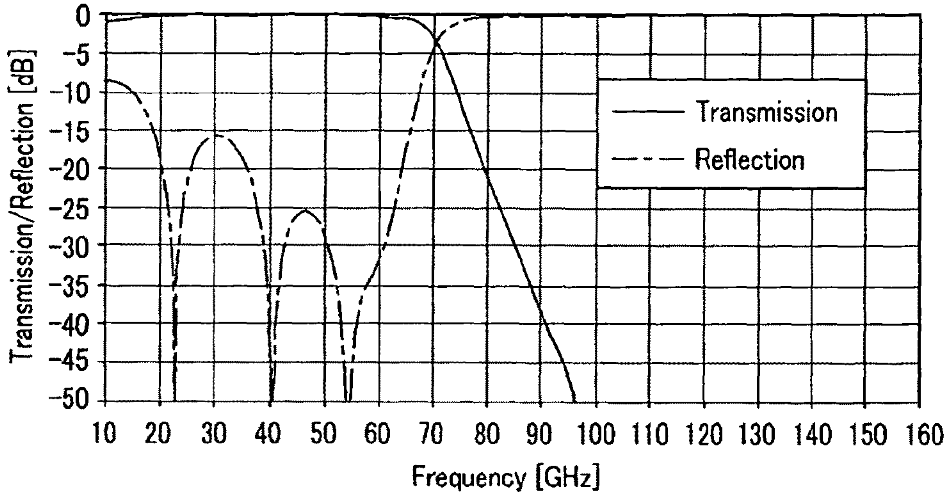
FIG. 14 illustrates theoretical characteristics of low pass filters for 22 GHz, 43/86 GHz, and 129 GHz.
Figure 15:
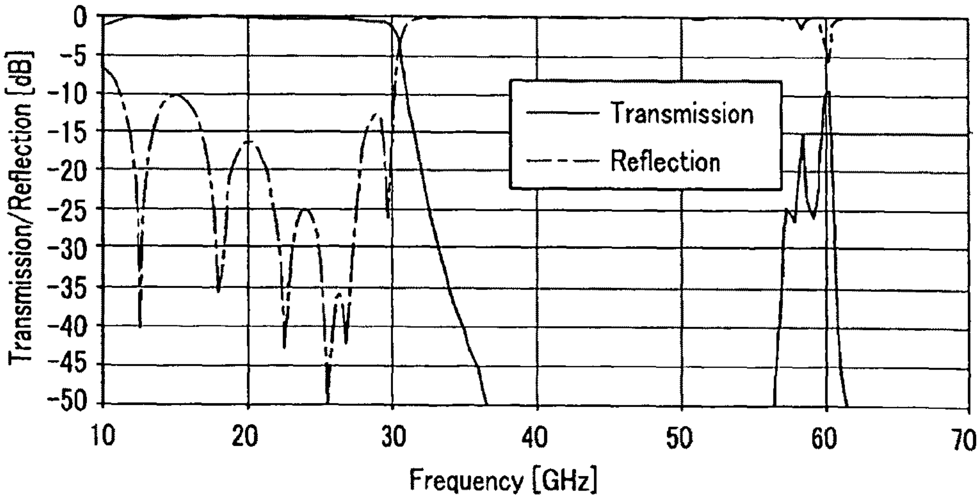
FIG. 15 illustrates theoretical characteristics of a low pass filter for 22/43 GHz.
Figure 16:
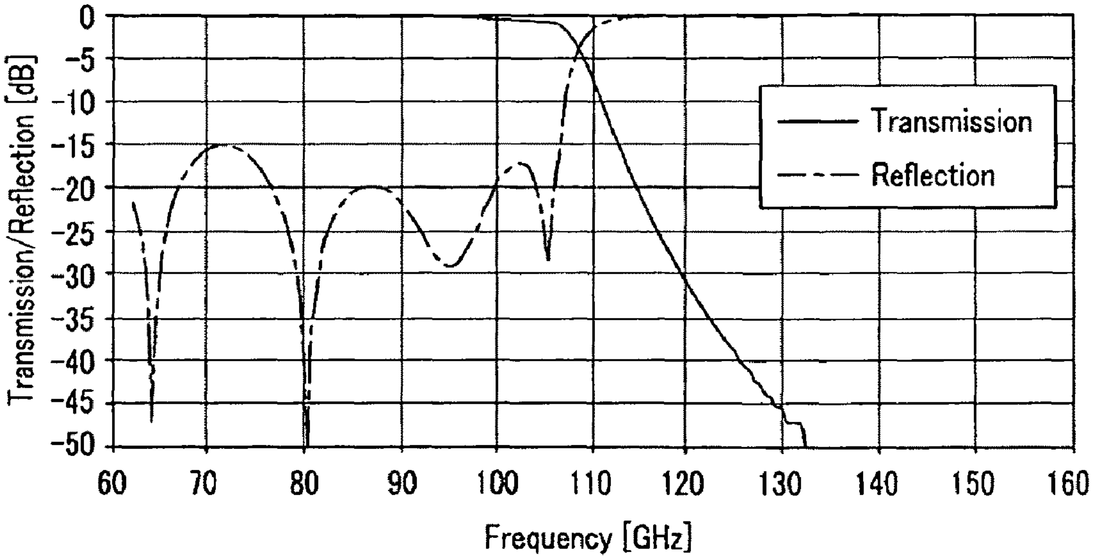
FIG. 16 illustrates theoretical characteristics of a low pass filter for 86/129 GHz.

FIGS. 14 through 16 illustrate theoretical characteristics of low pass filters. In detail, FIG. 14 illustrates theoretical characteristics of low pass filters for 22 GHz, 43/86 GHz, and 129 GHz. FIG. 15 illustrates theoretical characteristics of a low pass filter for 22/43 GHz. FIG. 16 illustrates theoretical characteristics of a low pass filter for 86/129 GHz.

First, transmission and reflection characteristics of a low pass filter for the first observation mode selector were tested. According to the test results, transmission loss in 22 GHz and 43 GHz bands is very low at about 0.5 dB or lower, and reflection loss in 86 GHz and 129 GHz bands is also very low at abut 0.5 dB or lower (refer to FIG. 14). The transmission and reflection losses of the second and third observation-mode selectors are also very low and are about 0.5 dB or lower (refer to FIGS. 15 and 16).

Figure 17:
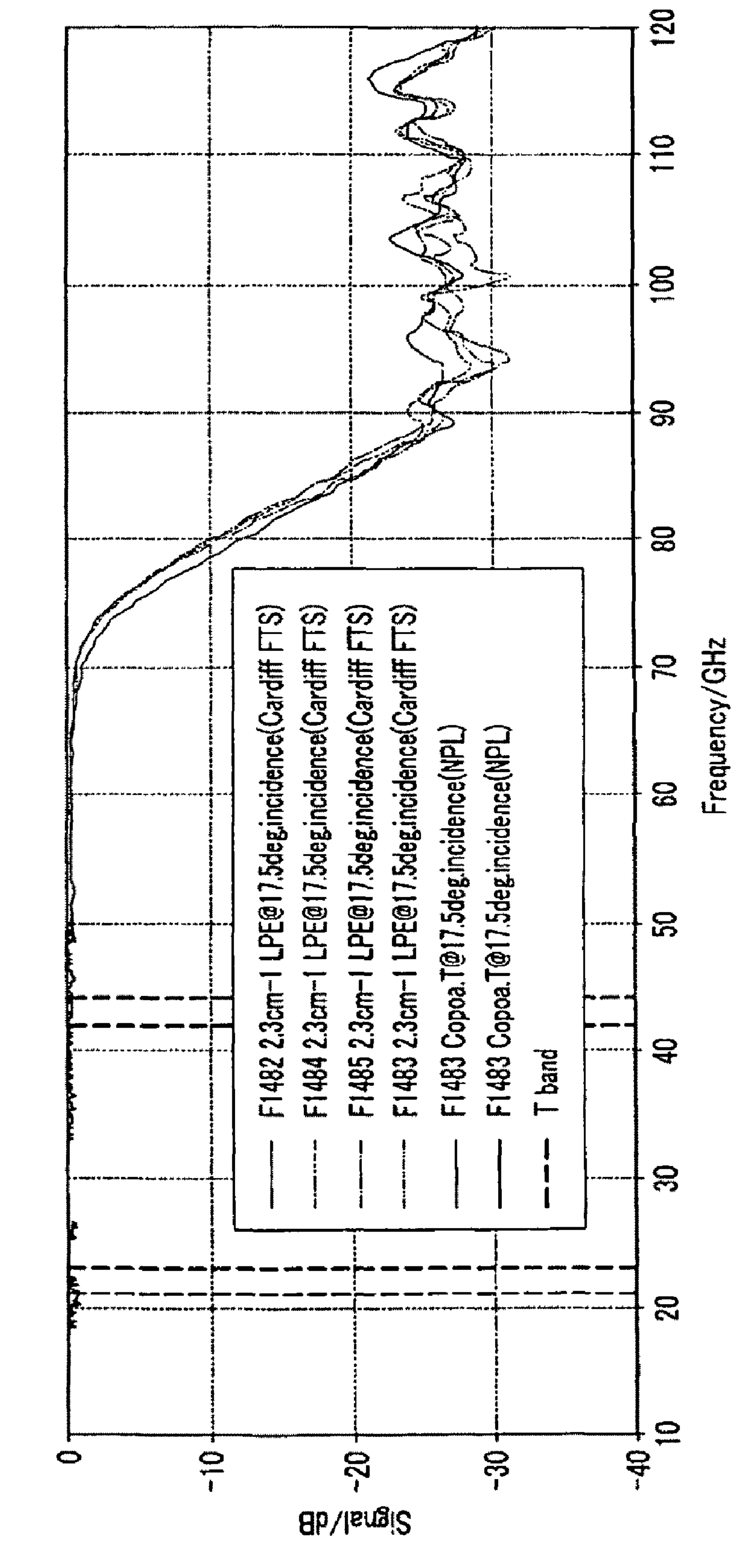
FIGS. 17 and 18 illustrate measured characteristics of a low pass filter of a first observation mode selector.
Figure 18:
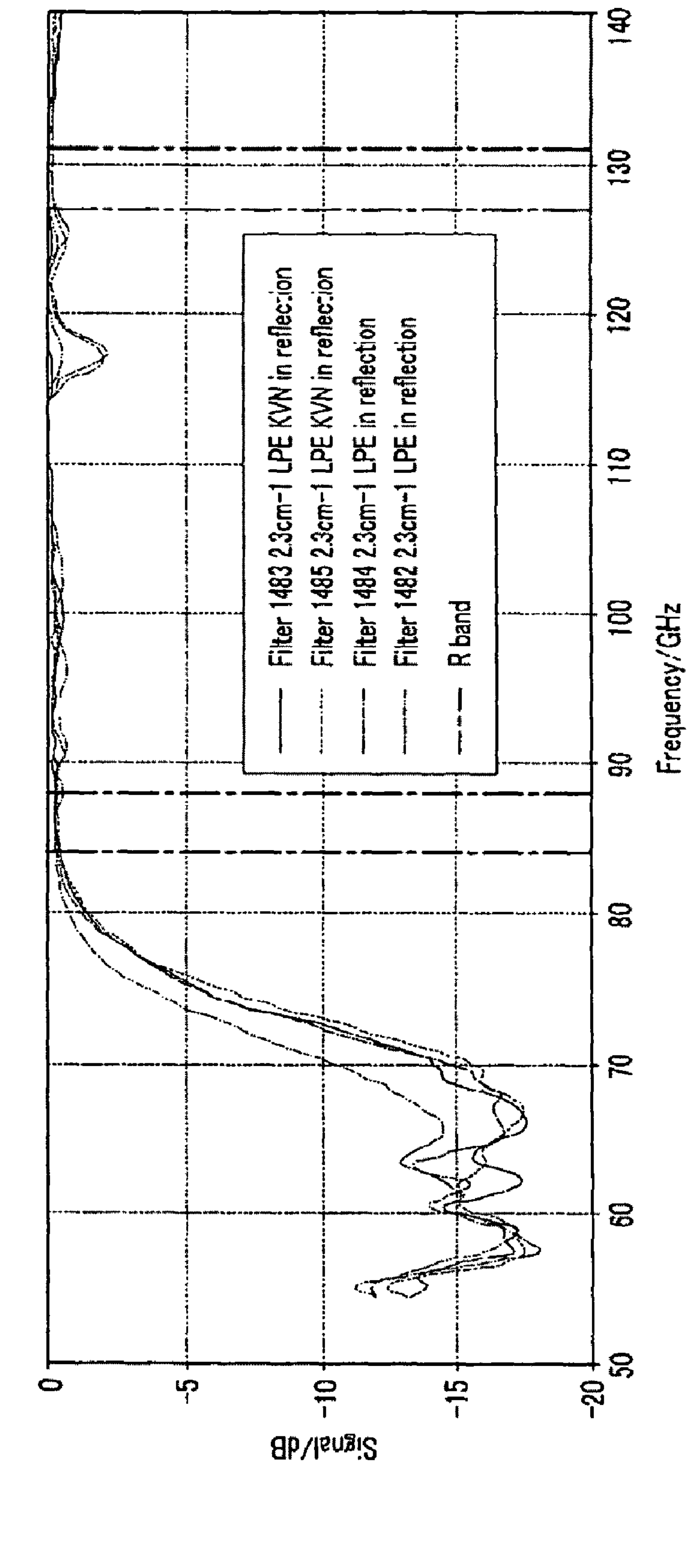
Figure 19:
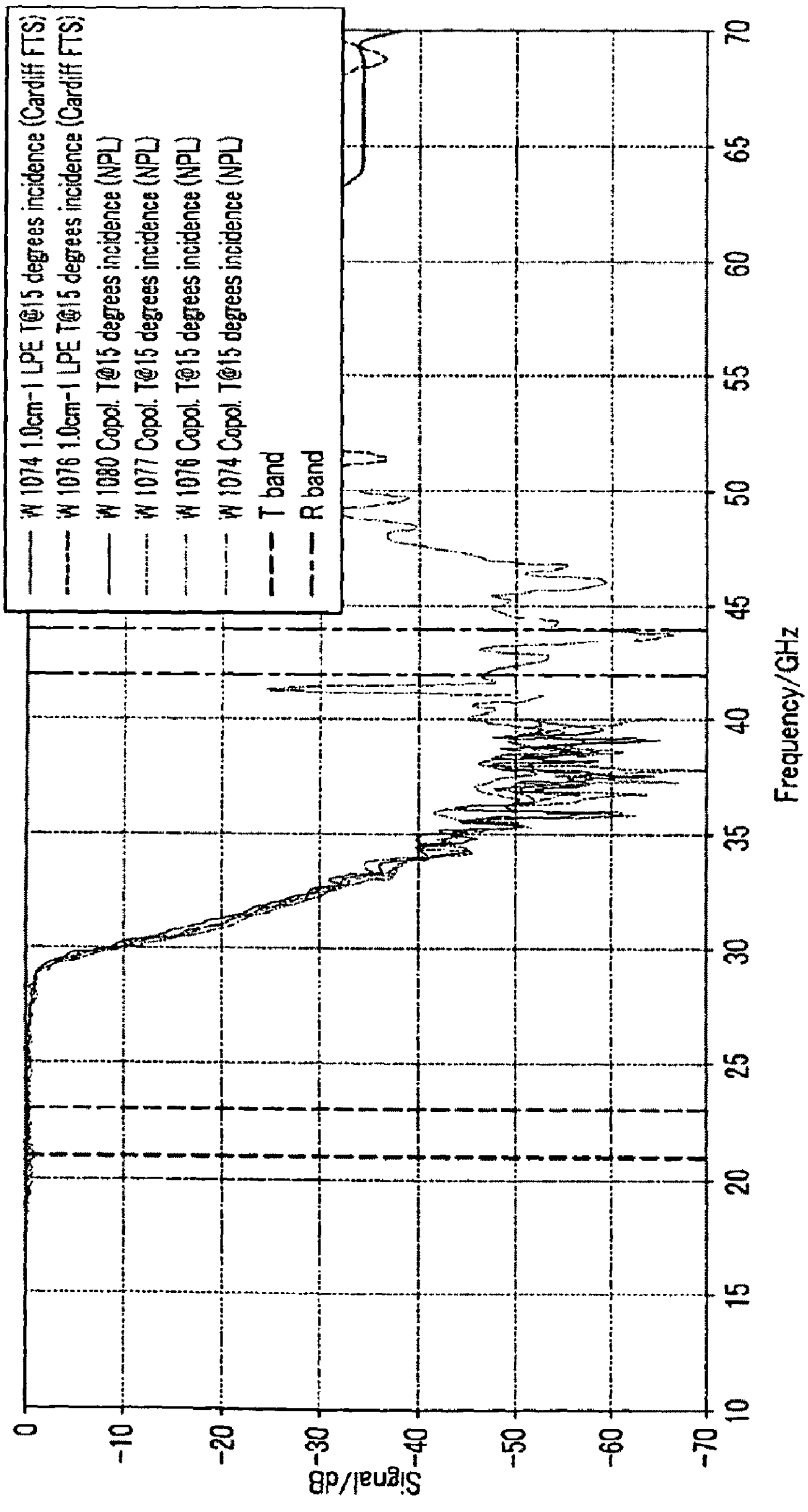
FIG. 19 illustrates measured characteristics of a low pass filter of a second observation mode selector.
Figure 20:
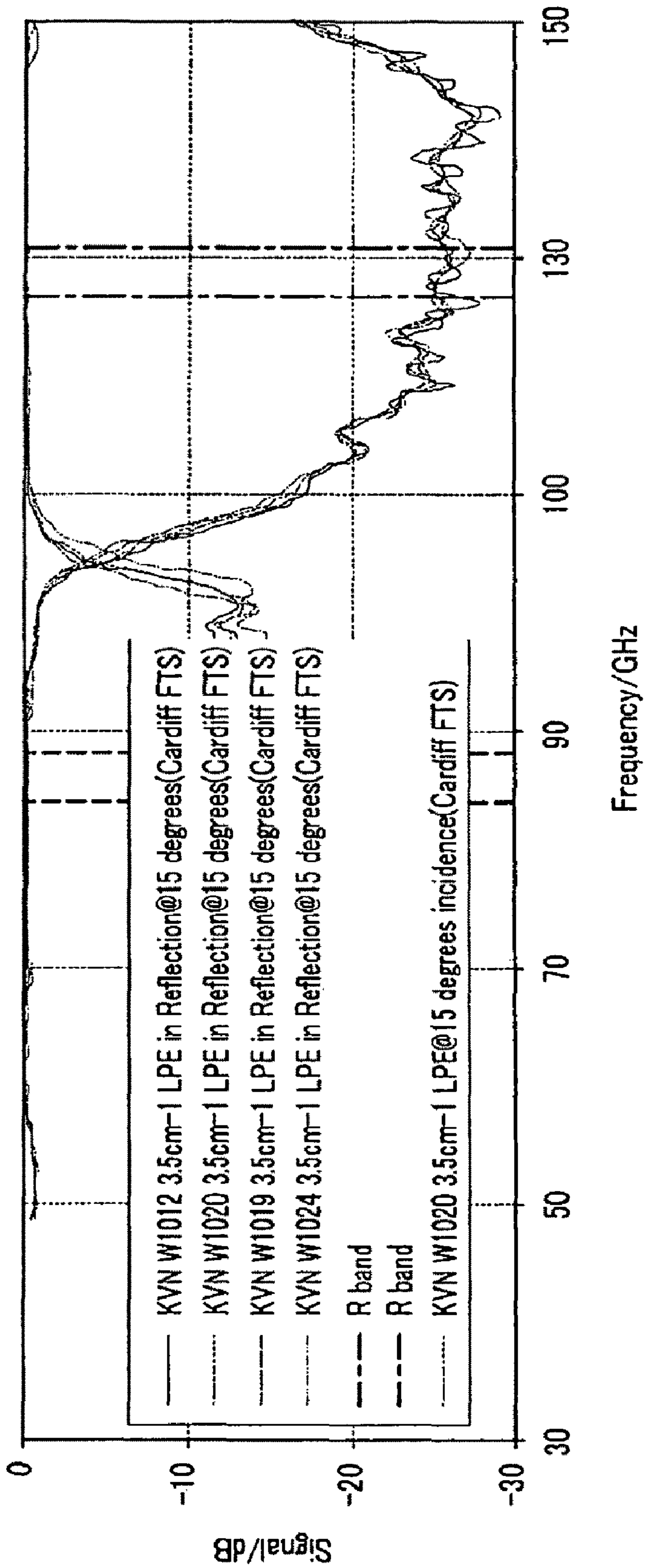
FIG. 20 illustrates measured characteristics of a low pass filter of a third observation mode selector.

FIGS. 17 and 18 illustrate measured characteristics of a low pass filter used in the first observation mode selector. FIG. 19 illustrates measured characteristics of a low pass filter used in the second observation mode selector, and FIG. 20 illustrates measured characteristics of a low pass filter used in the third observation mode selector.

The measured characteristics of the low pass filters are consistent with theoretical characteristics in the KVN observation frequency bands: 22 GHz, 43 GHz, 86 GHz, and 129 GHz bands. Both the transmission and reflection losses are about 0.5 dB or lower. Therefore, it can be understood from the test results that the low pass filters are suitable for the multi-frequency millimeter-wave VLBI receiving system of the present invention.

Fabrication of Quasi Optical Circuit

Observation mode selectors, ellipsoidal mirrors, flat mirrors, and a 45-degree flat mirror are installed on a receiver plate. All the quasi optical components are fabricated in a manner such that a laser beam can be precisely transmitted along a beam path. In addition, beam paths are marked on the receiver plate to arrange the quasi optical components more precisely.

In this way, 22 GHz, 43 GHz, 86 GHz, and 129 GHz band components of the multi-frequency millimeter-wave VLBI receiving system are aligned using a laser beam, and then the performance of the multi-frequency millimeter-wave VLBI receiving system can be evaluated using a beam measurement apparatus.

In the multi-frequency millimeter-wave VLBI receiving system of the present invention, ellipsoidal mirrors having a low aperture, and dichroic low pass filters are used for simultaneous observations in 22 GHz, 43 GHz, 86 GHz, and 129 GHz bands. This is based on intuitive Gaussian beam imaging, and the effects of the ellipsoidal mirrors having a low aperture can be predicted from the ellipsoidal mirrors M1 through M6 used in the above-described embodiment.

As described above, according to the present invention, a beam propagated from a celestial point is introduced into the receiver room via the 45-degree flat mirror and is divided according to frequency by the low pass filters having different bandwidths. Then, the divided beams are transmitted to the receivers having different bandwidths via the ellipsoidal and flat mirrors. Therefore, phase variations of the beams can be simultaneously observed and compensated for.

According to the multi-frequency millimeter-wave VLBI receiving system and the method of designing a quasi optical circuit for the multi-frequency millimeter-wave VLBI receiving system, a beam propagated from a celestial point and introduced into a receiver room via a 45-degree flat mirror is divided into a plurality of beams by using a plurality of low pass filters having different bandwidths, and the divided beams are transmitted to optical receivers having corresponding frequency bands via a plurality of mirrors. Therefore, phase variations of the beams can be simultaneously observed and compensated for.

Furthermore, a beam incident through the troposphere can be divided into 22 GHz, 43 GHz, 86 GHz, and 129 GHz band beams, and the divided beams can be transmitted to the receivers for simultaneously observing and compensating for phase variations of the beams in four frequency bands.

Moreover, in the multi-frequency millimeter-wave VLBI receiving system, an incident beam is reflected or transmitted (double-reflected) according to the frequency of the beam by using a plurality of low pass filters having different frequency bands so that the power consumption of the multi-frequency millimeter-wave VLBI receiving system can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-frequency millimeter-wave Very Long Baseline Interferometry (VLBI) receiving system comprising:
- a receiver room;
- a first mirror configured and positioned to introduce a cosmic radio wave signal beam propagated from a celestial point into the receiver room
- a plurality of low pass filters having different bandwidths configured for frequency dividing the cosmic radiowave signal beam into a plurality of divided beams according to frequency;
- a plurality of second mirrors, each second mirror positioned to reflect at least one of the plurality of divided beams from a respective low pass filter;
- a plurality of receivers having different bandwidths, each receiver receiving at least one beam from the plurality of divided beams reflected by at least one second mirror from the plurality of second mirrors, each receiver having a frequency band corresponding to the bandwidth of a respective low pass filter; and
- apparatus for simultaneously observing, and compensating for, the phase variations of the divided beams.

2. The multi-frequency millimeter-wave VLBI receiving system of claim 1, wherein:
- the first mirror is a 45-degree flat mirror disposed above the receiver room to introduce the signal beam propagated from a celestial point into the receiver room;
- a first one of the plurality of low pass filters is configured to reflect and transmit the beam incident from the 45-degree flat mirror;
- a first one of the plurality of second mirrors is configured to reflect the divided beam transmitted through the first one of the plurality of low pass filters;
- a second one of the plurality of low pass filters is configured to reflect and transmit the divided beam reflected by the first one of the plurality of second mirrors;
- second, eleventh, and third ones of the plurality of second mirrors are configured to reflect the divided beam transmitted through the second one of the plurality of low pass filters sequentially;
- a first receiver is configured to receive the divided beam reflected by the third one of the plurality of second mirrors;
- fourth, twelfth, and fifth ones of the plurality of second mirrors are configured to reflect the divided beam reflected by the second one of the plurality of low pass filters sequentially;
- a second receiver is configured to receive the divided beam reflected by the fifth one of the plurality of second mirrors;
- a sixth one of the plurality of second mirrors is configured to reflect the divided beam reflected by the first one of the plurality of low pass filters;
- a third one of the plurality of low pass filters is configured to reflect and transmit the divided beam reflected by the sixth one of the plurality of second mirrors;
- seventh, fifteenth, sixteenth, and eighth ones of the plurality of second mirrors are configured to reflect the divided beam transmitted through the third one of the plurality of low pass filters sequentially;
- a third receiver is configured to receive the divided beam reflected by the eighth one of the plurality of second mirrors;
- ninth, thirteenth, fourteenth, and tenth ones of the plurality of second mirrors are configured to reflect the divided beam reflected by the third one of the plurality of low pass filters sequentially; and
- a fourth receiver is configured to receive the divided beam reflected by the tenth one of the plurality of second mirrors.

3. The multi-frequency millimeter-wave VLBI receiving system of claim 2, further comprising a 2 GHz and 8 GHz flip-flop flat mirror disposed above the 45-degree flat mirror.

4. The multi-frequency millimeter-wave VLBI receiving system of claim 2, wherein the first one of the plurality of low pass filters has a bandwidth of 70 GHz or lower, the second one of the plurality of low pass filters has a bandwidth of 30 GHz or lower, and the third one of the plurality of low pass filters has a bandwidth of 108 GHz or lower.

5. The multi-frequency millimeter-wave VLBI receiving system of claim 2, wherein the first to third ones of the plurality of low pass filters are fabricated through an etching process or using multi-layer structure metal meshes divided by air gaps.

6. The multi-frequency millimeter-wave VLBI receiving system of claim 2, wherein the first to third ones of the plurality of low pass filters receive the divided beams at an incident angle less than 20°.

7. The multi-frequency millimeter-wave VLBI receiving system of claim 2, wherein the first to tenth ones of the plurality of second mirrors are ellipsoidal mirrors, and the eleventh to sixteenth ones of the plurality of second mirrors are flat mirrors.

8. The multi-frequency millimeter-wave VLBI receiving system of claim 7, wherein the first one or the sixth one of the plurality of second mirrors satisfies the following equations:

$$l_1 = f - R_1$$

$$l_2 = -\frac{l_1}{R_1} \cdot f$$

$$R_2 = \frac{l_2}{1 + \frac{l_1}{l_2} \cdot \frac{f}{R_1}} = \frac{l_2}{1 + \frac{l_1 - f}{R_1}} \to \infty$$

where $R_1$ denotes a radius of curvature of a divided beam incident onto an image subreflector, $R_2$ denotes a radius of curvature of a beam reflected by the ellipsoidal mirror, $I_1$ denotes a distance between the image subreflector and the ellipsoidal mirror, $I_2$ denotes a distance between the ellipsoidal mirror and $R_2$, and f denotes a distance from a focus of the image subreflector to the ellipsoidal mirror.

9. The multi-frequency millimeter-wave VLBI receiving system of claim 7, wherein phase mismatch on a surface of the first one or the sixth one of the plurality of second mirrors satisfies the following equation:

$$\Delta\phi_{total} = -\frac{\pi r^2}{\lambda} \cdot z\left(\frac{1}{R_1'^2} - \frac{1}{R_1^2} + \frac{1}{R_2'^2} - \frac{1}{R_2^2} + \frac{1}{f}\left(\frac{1}{R_2} - \frac{1}{R_2'}\right)\right)$$

where $R_1$ denotes a radius of curvature of a divided beam incident onto an image subreflector, $R_2$ denotes a radius of curvature of a divided beam reflected by the ellipsoidal mirror, and $R_1'$ and $R_2'$ denotes radii of curvature of divided beams at 22 GHz or 43 GHz for the first mirror and 86 GHz or 129 GHz for the sixth mirror.

10. The multi-frequency millimeter-wave VLBI receiving system of claim 9, wherein fractional loss caused by the phase mismatch is expressed by the following equation:

$$1 - G = \left[\frac{\pi}{\lambda}\omega_m^3 \tan\theta_i \cdot \left(\frac{1}{R_1'^2} - \frac{1}{R_1^2} + \frac{1}{R_2'^2} - \frac{1}{R_2^2} + \frac{1}{f}\left(\frac{1}{R_2} - \frac{1}{R_2'}\right)\right)\right]^2.$$

11. The multi-frequency millimeter-wave VLBI receiving system of claim 2, wherein the first receiver receives a 22 GHz band, the second receiver receives a 43 GHz band, the third receiver receives an 86 GHz band, and the fourth receiver receives a 129 GHz band.

12. The multi-frequency millimeter-wave VLBI receiving system of claim 2, wherein a distance between the 45-degree flat mirror and the first one of the plurality of low pass filters is 1010 mm±10 mm, a distance between the first one of the plurality of low pass filters and the first one of the plurality of second mirrors is 600 mm±10 mm, a distance between the first mirror of the plurality of second mirrors and the second one of the plurality of low pass filters is 642.78 mm±10 mm, a distance between the second one of the plurality of low pass filters and the second one of the plurality of second mirrors is 957.22 mm±10 mm, a distance between the second one of the plurality of second mirrors and the eleventh one of the plurality of second mirrors is 462.78 mm±10 mm, a distance between the eleventh one of the plurality of second mirrors and the third one of the plurality of second mirrors is 320 mm±10 mm, and a distance between the third one of the plurality of second mirrors and a corrugated horn of the first receiver is 462.78 mm±10 mm.

13. The multi-frequency millimeter-wave VLBI receiving system of claim 12, wherein an angle between incident and reflected divided beams at the second one of the plurality of second mirrors is 30°±5°, and an angle between incident and reflected divided beams at the third one of the plurality of second mirrors is 48°±5°.

14. The multi-frequency millimeter-wave VLBI receiving system of claim 12, wherein a distance between the second one of the plurality of low pass filters and the fourth one of the plurality of second mirrors is 850 mm±10 mm, a distance between the fourth one of the plurality of second mirrors and the twelfth one of the plurality of second mirrors is 496 mm±10 mm, a distance between the twelfth one of the plurality of second mirrors and the fifth one of the plurality of second mirrors is 604 mm±10 mm, and a distance between the fifth one of the plurality of second mirrors and a corrugated horn of the second receiver is 250 mm±10 mm.

15. The multi-frequency millimeter-wave VLBI receiving system of claim 14, wherein an angle between incident and reflected divided beams at the second receiver is 30°±5°, an angle between incident and reflected divided beams at the fourth one of the plurality of second mirrors is 31°±5°, an angle between incident and reflected divided beams at the twelfth one of the plurality of second mirrors is 37°±5°, and an angle between incident and reflected divided beams at the fifth one of the plurality of second mirrors is 50°±5°.

16. The multi-frequency millimeter-wave VLBI receiving system of claim 12, wherein a distance between the first one of the plurality of low pass filters and the sixth one of the plurality of second mirrors is 400 mm±10 mm, a distance between the sixth one of the plurality of second mirrors and the third one of the plurality of low pass filters is 419 mm±10 mm, a distance between the third one of the plurality of low pass filters and the seventh one of the plurality of second mirrors is 880.99 mm±10 mm, a distance between the seventh one of the plurality of second mirrors and the fifteenth one of the plurality of second mirrors is 650 mm±10 mm, a distance between the fifteenth one of the plurality of second mirrors and the sixteenth one of the plurality of second mirrors is 230.99 mm±10 mm, a distance between the sixteenth one of the plurality of second mirrors and the eighth one of the plurality of second mirrors is 200.01 mm±10 mm, and a distance between the eighth one of the plurality of second mirrors and a corrugated horn of the third receiver is 200.01 mm±10 mm.

17. The multi-frequency millimeter-wave VLBI receiving system of claim 16, wherein an angle between incident and reflected divided beams at the sixth one of the plurality of second mirrors is 50°±5°, an angle between incident and reflected divided beams at the seventh one of the plurality of second mirrors is 30°±5°, an angle between incident and reflected divided beams at the fifteenth one of the plurality of second mirrors is 53°±5°, and an angle between incident and reflected divided beams at the eighth one of the plurality of second mirrors is 52°±5°.

18. The multi-frequency millimeter-wave VLBI receiving system of claim 16, wherein a distance between the third one of the plurality of low pass filters and the ninth one of the plurality of second mirrors is 900 mm±10 mm, a distance between the ninth one of the plurality of second mirrors and the thirteenth one of the plurality of second mirrors is 660 mm±10 mm, a distance between the thirteenth one of the plurality of second mirrors and the fourteenth one of the plurality of second mirrors is 262.5 mm±10 mm, a distance between the fourteenth one of the plurality of second mirrors and the tenth one of the plurality of second mirrors is 127.5 mm±10 mm, and a distance between the tenth one of the plurality of second mirrors and a corrugated horn of the fourth receiver is 150 mm±10 mm.

19. The multi-frequency millimeter-wave VLBI receiving system of claim 18, wherein an angle between incident and reflected divided beams at the sixth one of the plurality of second mirrors is 50°±5°, an angle between incident and reflected divided beams at the third one of the plurality of low pass filters is 30°±5°, an angle between incident and reflected divided beams at the ninth one of the plurality of second mirrors is 30°±5°, an angle between incident and reflected divided beams at the thirteenth one of the plurality of second mirrors is 57°±5°, and an angle between incident and reflected divided beams at the tenth one of the plurality of second mirrors is 52°±5°.

20. A method of compensating for phase variations in beams transmitted to receivers for a multi-frequency millimeter-wave VLBI receiving system, the method comprising:

allowing a cosmic radio wave signal beam propagated from a celestial point to be incident into a receiver room via a flat mirror;

dividing the incident beam in the receiver room into a plurality of divided beams by transmitting and reflecting the incident beam using a plurality of low pass filters having different bandwidths and a plurality of ellipsoidal mirrors;

transmitting the divided beams via a plurality of flat mirrors to receivers, each receiver having a frequency band corresponding to the bandwidth of a low pass filter; and simultaneously observing and compensating for phase variations of the divided beams transmitted to the receivers.

21. The method of claim 20, wherein the divided beam is divided into 22 GHz, 43 GHz, 86 GHz, and 129 GHz band beams, and phase variations of the 22 GHz, 43 GHz, 86 GHz, and 129 GHz band beams are simultaneously observed and compensated for.

22. The method of claim 21, wherein the incident beam is divided into a plurality of divided beams using three low pass filters having different bandwidths.

* * * * *